(12) United States Patent
Dutta et al.

(10) Patent No.: US 11,158,020 B2
(45) Date of Patent: Oct. 26, 2021

(54) ASSIGNING RIDES BASED ON PROBABILITY OF PROVIDER ACCEPTANCE

(71) Applicant: Lyft, Inc., San Francisco, CA (US)

(72) Inventors: Chinmoy Dutta, Mountain View, CA (US); Adam Greenhall, Seattle, WA (US); Christopher Sholley, San Francisco, CA (US); Jimmy Young, San Francisco, CA (US); Jatin Chopra, San Francisco, CA (US)

(73) Assignee: LYFT, INC., San Francisco, CA (US)

( * ) Notice: Subject to any disclaimer, the term of this patent is extended or adjusted under 35 U.S.C. 154(b) by 345 days.

(21) Appl. No.: 15/859,111

(22) Filed: Dec. 29, 2017

(65) Prior Publication Data

US 2019/0206008 A1 Jul. 4, 2019

(51) Int. Cl.
*G06Q 50/30* (2012.01)
*G06Q 10/06* (2012.01)
*G06N 7/00* (2006.01)

(52) U.S. Cl.
CPC ............. *G06Q 50/30* (2013.01); *G06N 7/005* (2013.01); *G06Q 10/063112* (2013.01)

(58) Field of Classification Search
CPC . G06Q 50/30; G06Q 10/063112; G06N 7/005
See application file for complete search history.

(56) References Cited

U.S. PATENT DOCUMENTS

| 2015/0161564 A1* | 6/2015 | Sweeney ........ G06Q 10/063114 705/338 |
| 2017/0011324 A1* | 1/2017 | Truong ................. G06Q 50/32 |
| 2017/0227370 A1* | 8/2017 | O'Mahony ............ G06Q 10/02 |
| 2019/0325374 A1* | 10/2019 | Pan ........................ G06Q 50/30 |

OTHER PUBLICATIONS

D. Ma, On-demand Dynamic Bi-/multi-modal Ridesharing using Optimal Passenger-vehicle Assignments, Jun. 2017 (Year: 2017).*

* cited by examiner

*Primary Examiner* — Mohamed N El-Bathy
(74) *Attorney, Agent, or Firm* — Keller Jolley Preece

(57) ABSTRACT

The present disclosure relates assigning ride requests to providers based on the probability that a provider will accept the request. For example, one or more embodiments identify a first provider to assign the ride request. The system then generates a probability of acceptance for that provider. The system then determines an estimated time-to-arrival for the first provider and an alternate estimated time-to-arrival associated with a re-assigned provider. Based on the acceptance probability, the estimated time-to-arrival, and the alternate estimated time-to-arrival, the system then determines an expected time-to-arrival associated with the first provider. The system assigns ride requests to providers based on optimizing the expected time-to-arrival across multiple potential providers for a ride request.

20 Claims, 13 Drawing Sheets

| | Expected Time-To-Arrival (in minutes) | |
|---|---|---|
| | First Ride Request | Second Ride Request |
| driver_A | 2.65 | 2.05 |
| driver_B | 2.03 | 1.15 |
| driver_C | 2.7 | 1.55 |

ASSIGNING RIDES BASED ON PROBABILITY OF PROVIDER ACCEPTANCE

BACKGROUND

With advancements in technology, transportation systems have become faster and more convenient for users. For example, many transportation systems allow a rider to request a ride via an application implemented on an electronic device, such as a mobile device. In response to the ride request, the transportation system may detect which participating drivers are available to transport the rider, select a driver from the available drivers to provide a ride, notify the selected driver of the ride request through an electronic device associated with the selected driver, and notify the rider of the selected driver via the application on the electronic device through which the ride was requested.

Despite various technological advancements, conventional transportation systems have several technological shortcomings that decrease efficiency and reliability of conventional systems. For example, many conventional transportation systems allow a time interval within which a driver may respond to an assigned ride request (affirmatively accept or reject via a client device). In many cases, the system may not receive a response from a driver, which results in a default rejection of the ride request. A failure to respond may be due to network connectivity issues or a failure to log out of the system after ending a shift or while on a break. In other cases, a driver may affirmatively reject a ride request. Whether the ride request is rejected affirmatively or by default, the rejection increases the request-to-pick-up time due to the time the system waits for an initial response to the ride request as well as the time the system takes to find a new driver. This chain of rejections can significantly increase the request-to-pick-up time for a rider, result in an inefficient use of vehicle resources, and increase the computational resources required to ultimately assign a vehicle to a given ride request.

Additionally, a rejection of a ride request causes the transportation system to determine and provide inaccurate information to a rider, as well as use inaccurate information when assigning ride requests to vehicles. For example, many transportation systems provide a rider requesting a ride with an estimation of when the assigned driver will arrive for pick-up (i.e., estimated time-to-arrival). A conventional transportation system may determine this estimated time based on the assumption that an assigned driver will accept the ride and dispatch to pick-up the rider. When the assigned driver rejects the ride request, the actual request-to-pick-up time increases (for the above-mentioned reasons) beyond the estimated time-to-arrival. Consequently, the system fails to perform accurately.

Not only does rejection of ride of a ride request cause a transportation system to provide inaccurate information to a rider, such a rejection also interferes with the system's optimization. For instance, a transportation system may be optimized to minimize the total request-to-pick-up time among a set of ride requests. As a result, the system may assign each driver to the closest rider associated with a request. If a particular driver rejects an assigned ride request, the next closest driver may not be available due to an assignment to another rider. Consequently, the ride request may be assigned to a driver that is much farther away from the rider, greatly increasing the time the rider associated with the rejected request will wait for pick-up, and significantly underutilizing vehicle resources within the transportation system. When considering that modern transportation systems may receive hundreds or thousands of ride requests per minute, the effect of ride request rejections significantly reduces the efficiency and use of vehicle resources within conventional transportation systems.

Further, rejection of a ride request places an additional burden on the computational devices implementing the transportation system. For example, when a driver rejects a ride request, the system must recalculate the list of drivers available for dispatch, select another driver to provide the ride, and wait for a response. In other words, the system repeats the process used for assigning the request to the first driver, doubling the computational load. Therefore, a rejection costs additional resources, such as memory and processing power, which can be strained when dealing with many requests simultaneously.

SUMMARY

One or more embodiments described herein provide benefits and/or solve one or more of the foregoing or other problems in the art with systems, methods, and computer readable storage media that assign ride requests based on the probability that a driver will reject the request. For example, in one or more embodiments a system receives a ride request from a client device associated with a rider. The system then determines an expected time within which a potential driver will arrive at the pickup location of the ride request. In one or more embodiments, the system determines the expected time-to-arrival based on a determining a probability that a potential driver will accept the ride request, the estimated time-to-arrival of the potential driver upon acceptance of the request, and an alternate estimated time-to-arrival associated with an alternate driver to whom the ride request may be re-assigned upon rejection by the potential driver. The system then assigns the ride request to a driver based on optimizing the expected time-to-arrival across potential drivers. In other words, the system dynamically accounts for a potential request rejection and associated delays when assigning a ride request to a driver.

The following description sets forth additional features and advantages of one or more embodiments of the disclosed systems, computer readable storage media, and methods. In some cases, such features and advantages will be obvious to a skilled artisan from the description or may be learned by the practice of the disclosed embodiments.

BRIEF DESCRIPTION OF THE DRAWINGS

This disclosure will describe one or more embodiments of the invention with additional specificity and detail by referencing the accompanying figures. The following paragraphs briefly describe those figures in which.

DETAILED DESCRIPTION

Figure 1:
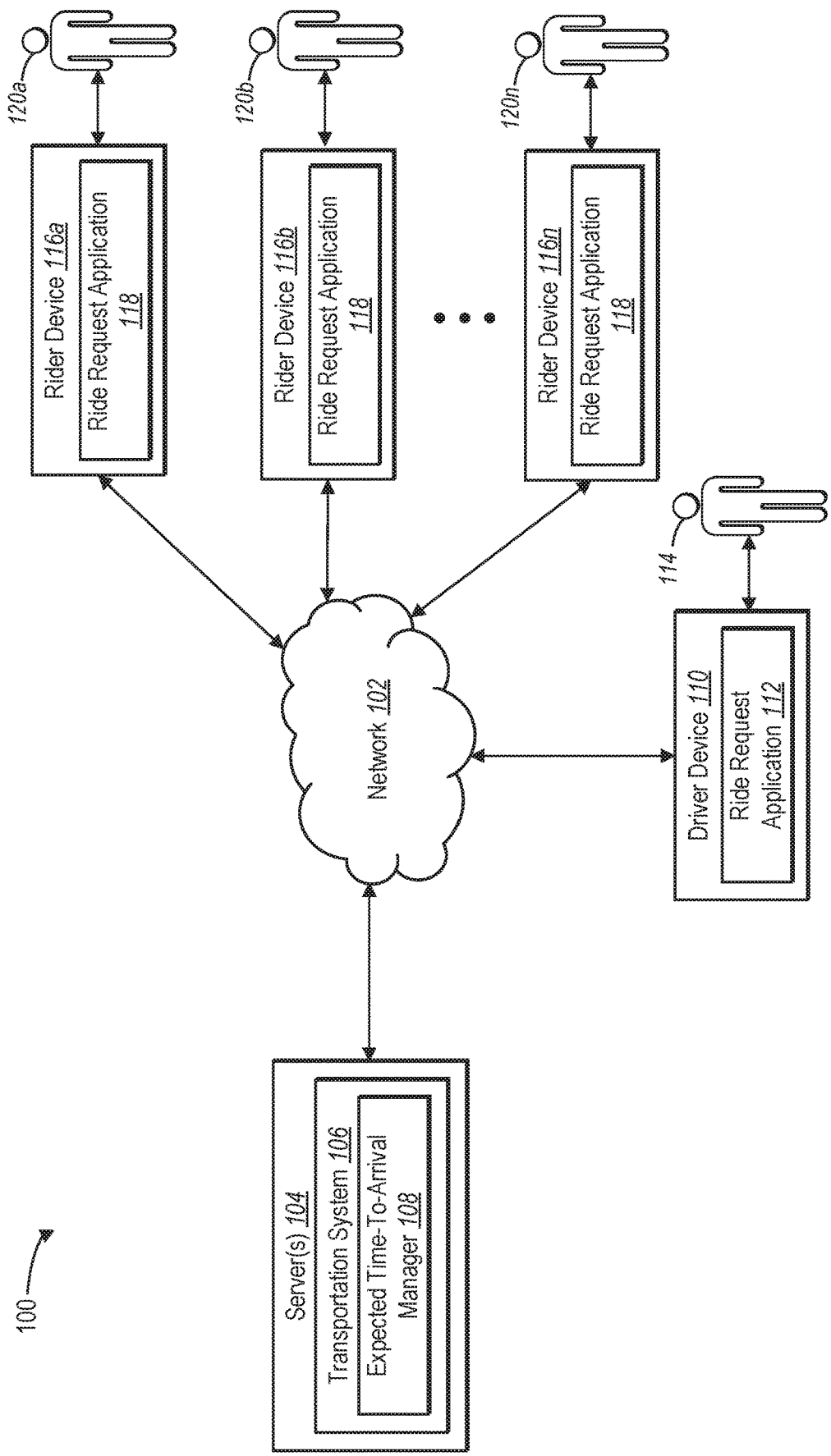
FIG. 1 illustrates a schematic diagram of an example environment in which a system manager can operate in accordance with one or more embodiments.

One or more embodiments described herein include a transportation system having an expected time-to-arrival manager for assigning ride requests to drivers based on a probability that drivers will accept an assigned ride request. In particular, the expected time-to-arrival manager (or simply "system manager") receives a ride request from a client device associated with a rider and determines an expected time within which a potential driver will arrive at the pickup location of the ride request. The system manager generates the expected time-to-arrival based on determining a probability that a potential driver will accept the ride request, the estimated time-to-arrival for the potential driver if the potential driver accepts the request, and an alternate estimated time-to-arrival associated with an alternate driver to whom the ride request may be re-assigned upon rejection by the potential driver. The system manager then assigns the ride request to a driver based on optimizing the expected time-to-arrival across multiple potential drivers. In other words, the system manager dynamically accounts for potential ride request rejections and associated delays when assigning a ride request to a driver.

As a general example, a provider (e.g., driver) can prefer some types of rides while disfavoring other types of rides based on pickup locations, drop off locations, and/or other factors. Because a provider is free to choose whether or not to accept any assigned ride request, the system manager optimizes ride request acceptance rates across the transportation system by assigning ride requests based in part on the likelihood a particular driver is going to accept a particular ride request. For instance, based on characteristics associated with a ride request, the system manager can determine a probability that one or more providers will accept that ride request. Using those probabilities, along with other factors (such as provider location), the system manager determines an expected time-to-arrival for each provider that factors in the probability of acceptance, and then assigns the ride request to the provider with the lowest expected time-to-arrival.

To increase the clarity of the following general discussion, a general explanation of the difference between "estimated time-to-arrival" and "expected time-to-arrival" is needed. "Estimated time-to-arrival" represents an approximate amount of time for a specific driver to arrive at a pickup location upon the specific driver accepting a ride request. Thus, the estimated time-to-arrival for a driver is based on an assumption that the driver accepts the request. On the other hand, "expected time-to-arrival" is an approximate amount of time for at least one of multiple potential drivers to arrive at a pickup location when taking into account the possibility that a driver may reject the ride request. Therefore, generally speaking, the "estimated time-to-arrival" assumes acceptance of a ride request, while the "expected time-to-arrival" factors in time delays based on a possibility that a driver may reject a ride request.

As just mentioned, the expected time-to arrival determined for a given driver depends on the probability that the driver will accept the ride request. In particular, a driver's probability of acceptance quantifies whether the driver is a good match for the ride request. There may be various reasons why a driver is not a good match for a ride request and the system manager operates to provide the best possible match for the ride request. In some embodiments, the system manager can determine the probability that the driver will accept the ride request using a trained machine learning model. For example, in one or more embodiments, the system manager trains a machine learning model using training data that includes sets of features associated with past ride requests that were accepted or rejected. Once trained, the system manager applies a set of features associated with a current ride request to the trained model to determine the probability that a driver will accept the current ride request.

In addition to using a machine learning model to determine the probability of a given driver accepting a ride request, the system manager can also, or alternatively, employs heuristic methods to determine the driver's acceptance probability. More particularly, the system manager first determines a probability metric, and then determines the acceptance probability based on the metric. For example, in one or more embodiments, the system manager determines a driver's average accept rate over a previous time period, or an exponentially weighted average accept rate of the first driver. In addition, the system manager can access historical data associated with prior ride acceptances and rejections for a given driver to use in a heuristic method.

As mentioned above, the system manager uses the acceptance probability corresponding to a driver to determine an expected time-to-arrival for a ride request. More particularly, the probability that a driver assigned to a ride request will accept the request provides the complementary probability that the driver will reject the ride request and, therefore, the probability that the time between request and pickup will increase due to delays associated with the rejection. Therefore, a higher probability of acceptance results in a lower expected time-to-arrival because the probability of experiencing extra time delays due to a rejection is low. Conversely, a lower probability of acceptance results in a higher expected time-to-arrival.

In one or more embodiments, the system manager uses a driver's acceptance probability in combination with the driver's estimated time-to-arrival and/or an alternate estimated time-to-arrival to determine the expected time-to-arrival for the driver. As previously mentioned, the estimated time-to-arrival for a driver is the time required by the driver to travel from the driver's current location upon assignment of the ride request to the pick-up location associated with the ride request. The alternate estimated time-to-arrival comprises the estimated time-to-arrival for a reassigned driver of the ride request, where the re-assigned driver receives the ride request if the first driver is assigned the request and rejects it. Accordingly, system manager determines the estimated time-to-arrival for a potential driver and the alternate time-to-arrival for a reassigned driver. The system manager then applies the probability of the potential driver's acceptance to the estimated time-to-arrival and the alternate time-to-arrival to determine the expected time-to-arrival.

With respect to determining the alternate time-to-arrival, the system manager may use multiple approaches for generating this value. For example, depending on a particular embodiment, the system manager may or may not know (e.g., explicitly select) the reassigned driver at the time of determining the alternate estimated time-to-arrival. For example, in one or more embodiments, the system manager determines the alternate estimated time-to-arrival using the estimated time-to-arrival values for one or more alternative drivers near a first driver or near a pick-up location corresponding to a ride request. In other embodiments, the system manager determines the alternate estimated time-to-arrival implicitly and without explicitly solving for the specific time-of-arrival values associated with specific alternate drivers.

The system manager (and the resulting transportation system incorporating the system manager) provides several advantages over conventional transportation systems. For example, by accounting for the probability of acceptance and time delays caused by rejection, the system manager may avoid selecting a bad driver match for the ride request that would result in a rejection and unnecessarily introduce significant inefficiencies and time delays into the transportation system. Or in other words, the system manager avoids assigning a ride request to a driver that will not be interested in accepting the ride request. Thus, the system manager more efficiently matches drivers to ride requests. To illustrate this advantage, there may be a primary driver who is closest to the pick-up location of a ride request and a secondary driver who is second closest to the pick-up location. Further, the primary driver may have a low acceptance probability (i.e., high probability of rejecting the request), while the secondary driver has a high acceptance probability (i.e., low probability of rejecting the request).

In such a situation, a conventional transportation system typically assigns the ride request to the primary driver simply because the primary driver is closest to the pick-up location since conventional systems typically assume that an assignment to the closest driver provides the quickest request-to-pick-up time for a ride. But if the primary driver is a bad match and rejects the request, the system must re-assign the request to another driver, incurring associated delays, increasing the request-to-pick-up time, and introducing other systematic and computational inefficiencies.

In contrast, the system manager described herein accounts for driver acceptance probabilities to optimize request-to-pickup times, vehicle resources, and computational resources. For example, because the secondary driver has a high probability of accepting the ride request (i.e., the ride request is a good match for the secondary driver) and is also relatively close to the pick-up location, assigning the ride request directly to the second driver may actually provide the fastest request-to-pick-up time. Furthermore, over hundreds or thousands of similar scenarios, the system manager generates ride requests assignments with an overall increase in efficiency across the transportation system as a whole, and effectively minimizes the request-to-pick-up time for ride requests based on considering each of the driver's probability of accepting a given ride request.

Additionally, compared to conventional systems, the system manager provides more accurate information to a rider regarding the request-to-pick-up time. For example, when a rider submits a ride request, a transportation system may provide an estimate of the time that will elapse before a driver arrives to the pick-up location to pick up the rider. Because conventional systems assume the first assigned driver will accept the ride request, the estimate becomes inaccurate when a driver rejects the request. By accounting for the possibility of rejection and associated delays into the expected time-to-arrival determination, and assigning ride requests based on that value, the system manager is able to more accurately predict and provide a time within which a driver will arrive to pick up the rider.

Further, the system manager provides better ride request assignment optimization than conventional transportation systems. As mentioned above, a rejection of a ride request can interfere with the optimization of a conventional transportation system dealing with multiple requests as it may require a ride request to be re-assigned to a new driver that is very far away. By determining the probability that a driver will reject a request before assigning it to that driver, the system manager avoids drivers who are likely to reject requests. Consequently, the system manager minimizes the need to re-assign rides and prevents related optimization problems.

Further, because the system manager helps to avoid assigning ride requests to drivers likely to reject the request, the transportation system avoids the computational resource waste associated with re-assignment. More particularly, because the system manager will assign ride requests to those drivers who are more likely to accept the requests, the implementing computational devices avoid reiterating the assignment process to find a new driver subsequent to a request rejection. This reduces the computational load on the implementing devices by reducing the use of memory, storage, processing, and communication resources.

This detailed description refers to various terms to describe the system manager and its related operations. As used herein, a "user" or "rider" refers to an individual, company, business, group, or other entity who interacts with the transportation system by way of a client device. For example, a rider can include a member or subscriber of a ride request application (e.g., a ride request application that includes, implements, or communicates with the transportation system). In addition, the term "client device" refers to a computing device operated by a rider and may include a device, such as a desktop computer or a mobile device (e.g., a smartphone). For example, a client device may refer to a rider device or a driver device.

Further, as used herein, the term "estimated time-to-arrival" refers to an approximation of the time required by a driver to travel from the driver's location, at the time the ride request is assigned, to the pick-up location associated with a ride request. For example, if a driver is two miles from the pick-up location, the estimated time-to-arrival would comprise an approximate time for the driver to drive the two miles to the pick-up location. The estimated time-to-arrival may take into account factors that affect the travel time, such as distance between locations, speed limits, current or predicted traffic, road construction, weather, optimal routes, traffic lights, etc.

On the other hand, and as used herein, the term "expected time-to-arrival" refers to the approximate time that will elapse between the submission of a ride request and the arrival of a driver at the pick-up location (i.e. the expected request-to-pick-up time). In particular, the expected time-to-arrival can include an approximated amount of time for a driver to arrive at a pick-up location when factoring in the probability of a rejected ride request. Indeed, the expected time-to-arrival can be based in part on an acceptance probability associated a potential driver when applied to an estimated time-to-arrival (defined above) for the potential driver. As used herein, "acceptance probability" or "probability of acceptance" or other like terms or phrases refers to the probability that a particular driver will accept a ride request (or inversely, reject a ride request).

In some examples, the expected time-to-arrival can further be based on an approximated amount of delay time associated with potential delays caused by a rejection request, such as delays caused by assigning the request to the first driver, waiting for the first driver to respond, or re-assigning the request to a new driver. In addition, the expected time-to-arrival can also be based on an approximated amount of time for a reassigned driver to arrive at a pickup location after an initial driver rejects a ride request. For example, and as used herein, the term "alternate estimated time-to-arrival" refers to the estimated time-to-arrival associated with a re-assigned driver to whom the ride request may be re-assigned upon rejection by the previously assigned driver.

Referring now to the figures, FIG. 1 illustrates an embodiment of an environment 100 in which an estimated time-to-arrival manager 108 operates (or "system manager 108"). Specifically, the environment 100 includes server(s) 104, a driver device 110 associated with a driver 114, and rider devices 116a-116n associated with riders 120a-120n communicating over a network 102. Although the environment 100 of FIG. 1 is depicted as having various components, the environment 100 may have any number of additional or alternative components (e.g., any number of servers, driver devices, rider devices, or other components in communication with the system manager 108 via the network 102). Accordingly, more than one component or entity in environment 100 can implement the operations of the system manager 108 described herein. To illustrate, the system manager 108 can alternatively be implemented on the driver device 110 or the rider devices 116a-116n and/or be part of another component or system.

According to one or more embodiments, the system manager 108 can be implemented within a transportation system 106. Although FIG. 1 illustrates the system manager 108 as part of the transportation system 106, the system manager 108 can be part of another system, or part of a plurality of systems. In addition, although FIG. 1 illustrates the transportation system 106 as being located on server(s) 104, it is understood based on the disclosure herein that the transportation system 106 can be implemented within one or more other components or within one or more combinations of components shown in environment 100.

The transportation system 106 may perform various services associated with providing transportation to riders 120a-120n of the rider devices 116a-116n. The transportation system 106 can receive, by way of the server(s) 104, ride requests sent by the rider devices 116a-116n associated with the riders 120a-120n and transmit a ride request assignment from the system manager 108 to the driver device 110 associated with the driver 114. Additionally, the transportation system 106 performs functions supportive of receiving and assigning of ride requests. For example, the transportation system 106 may collect and manage information regarding subscribers to the transportation system 106 (e.g., name information, home/business address, employment/employer, preference information, automobile information, driver/rider rating, payment information, etc.).

Additionally, the transportation system 106 may facilitate communication between the server(s) 104 and the driver device 110 and rider devices 116a-116n via network 102. Further, the transportation system 106 may map an area associated with a ride request and display the mapping on a display of the rider devices 116a-116n and the driver device 110. For example, the transportation system 106 may receive pick-up locations for ride requests and a current location of one or more drivers as determined by one or more location tracking systems (e.g., GPS). Subsequently, the transportation system 106 may display the pick-up location of a particular ride request to the particular driver assigned to the request and may additionally display one or more optional routes for the driver to take in order to arrive at the pick-up location. Additionally, the transportation system 106 may display, to the rider, the assigned driver's position as the driver travels to the pick-up location.

In one or more embodiments, the server(s) 104 may manage, generate, receive, and transmit any type of data associated with determining an expected time-to-open or assigning ride requests to drivers. For example, the server(s) 104 can collect and store information regarding both drivers and riders. Additionally, the server(s) 104 may communicate with the driver device 110 and/or rider devices 116a-116n over the network 102. For example, the server(s) 104 may receive ride requests from rider devices 116a-116n and communicate the requests to the transportation system 106. If the system manager 108 assigns a ride request to driver 114, the server(s) 104 communicate the assignment to the driver device 110 associated with the driver 114. In one or more embodiments, the server(s) 104 may also communicate the ride assignments and any associated information (e.g., the expected time-to-arrival) to the rider devices 116a-116n associated with the respective ride requests.

In one or more embodiments, the server(s) 104 store analytics data relevant to training a machine learning model to determine metrics relevant to the expected time-to-arrival. Alternatively, the server(s) 104 may access a separate analytics database storing the relevant analytics data. The analytics data may comprise feature data associated with past ride requests that impacted whether or not a driver accepted an assigned ride request. The system manager 108 uses this feature data to train a machine learning model to determine the probability that an identified first driver will accept a current ride request, which probability is then used to determine an expected time-to-arrival associated with that driver. Additionally, or alternatively, the analytics data may comprise feature data associated with past ride requests that impacted the overall request-to-pick-up time directly. In such a case, the system manager 108 may use the feature data to train a machine learning model to determine an expected time-to-arrival associated with an identified driver directly.

In one or more embodiments, the rider devices 116a-116n include client devices that allow users of the devices (e.g. riders 120a-120n) to submit ride requests to the servers(s) 104. For example, the rider devices 116a-116n can include smartphones, tablets, desktop computers, laptop computers, or other electronic devices. The rider devices 116a-116n can include one or more applications (e.g., ride request application 118) that allows the riders 120a-120n to submit ride requests. For example, the ride request application 118 can include a software application installed on the rider devices 116a-116n. Additionally, or alternatively, the ride request application 118 can include a software application hosted on the server(s) 104, which may be accessed by the rider devices 116a-116n through another application, such as a web browser.

In one or more embodiments, the driver device 110 includes a client device that allows a user of the device (e.g., driver 114) to receive ride request assignments from the server(s) 104 and to submit an acceptance or rejection of the ride request to the server(s) 104. For example, the driver device 110 can include a smartphone, a tablet, a desktop/laptop computer, or other electronic device. The driver device 110 can include one or more applications (e.g., ride request application 112) that allows the driver 114 to receive ride request assignments and accept or reject the request. The ride request application 112 can include a software application installed on the driver device 110. Additionally, or alternatively, the ride request application 112 can include a software application hosted on the server(s) 104, which may be accessed by the driver device 110 through another application, such as a web browser. In one or more embodiments, the ride request application 112 used by the driver device 110 is the same as the ride request application 118 used by the rider devices 116a-116n and is switched to a driver mode when used by the driver 114. Alternatively, the ride request application 112 is a driver-specific version only accessible to drivers.

Figure 2:
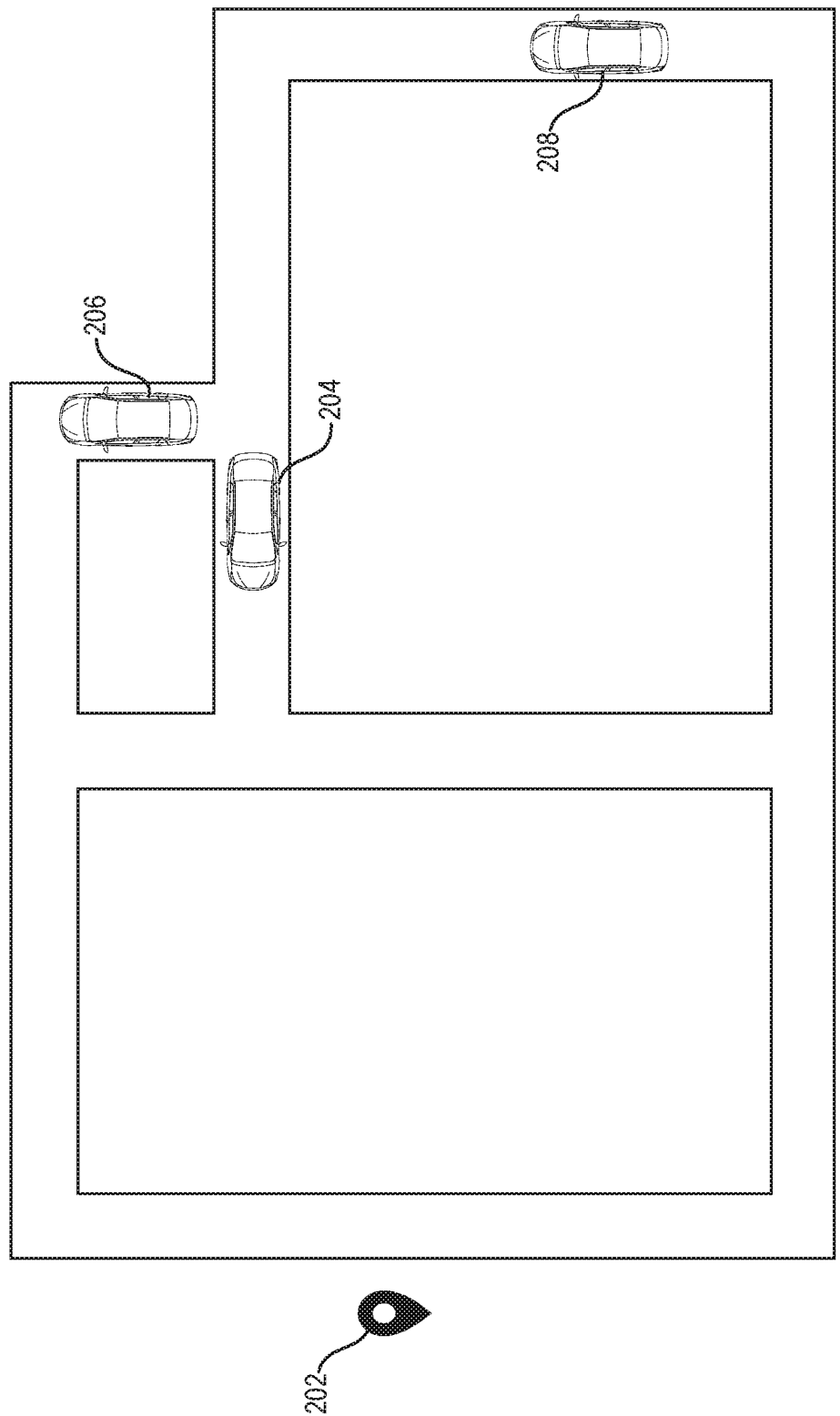
FIG. 2 illustrates an example map of a rider requesting a ride in accordance with one or more embodiments.

FIG. 2 illustrates an example map of a rider requesting a ride to provide an overview of determining an expected time-to-arrival for a ride request. More particularly, FIG. 2 depicts an exemplary scenario in which one or more embodiments of the system manager 108 determines an expected time-to-arrival associated with an identified first driver in response to a ride request. As used herein, the term "ride request" refers to the submission of a request for a ride by a user of a client device implementing a ride request application. In particular, a ride request may include information relevant to the ride, such as a pick-up location, a destination location, a pick-up time, a rider profile, a rider history, or a rider rating. A pick-up location may correspond to the current location of the rider (as determined by the location of the rider device associated with the rider) at the time the rider submits the ride request. Additionally, or alternatively, the rider may manually enter a pick-up location via the ride request application 118. For example, the rider may submit a request for a future ride (e.g., a ride for the next day) and provide a desired pick-up location when submitting the request. In assigning a ride request to a driver, the system manager transmits the ride request (including some or all of the associated information) to a client device associated with the driver. It should be noted that the discussion regarding FIG. 2 centers around determining whether one driver should be matched with a single ride request; however, in one or more embodiments, the system manager 108 more generally considers several available drivers when matching a ride request and operates to determine which of those drivers should be matched to the request. This broader operation will be discussed in detail with reference to FIG. 3.

Continuing with FIG. 2, the system manager 108 identifies one or more drivers available to fulfill a ride request (e.g., the closest driver 204, the second closest driver 206, and the third closest driver 208). In one or more embodiments, the system manager 108 identifies available drivers based on a proximity to the pick-up location 202. For example, the system manager 108 may identify all drivers currently within a predetermined distance threshold of the pick-up location 202 as available drivers. In other embodiments, the system manager 108 identifies potential drivers based on estimated times-to-arrival from a current location of each potential driver and the pick-up location, which account for traffic or other factors in addition to proximity.

Subsequently, the system manager 108 identifies a first driver from the available drivers. In particular, the first driver is a driver determined by the system manager 108 as a potential first assignee of the ride request (as opposed to a re-assigned driver to whom the ride request may be re-assigned upon rejection by the first driver). In one or more embodiments, the system manager 108 identifies the first driver based on one or more characteristics of the ride request. For example, the system manager 108 may identify the first driver based on the proximity of each available driver to the pick-up location 202. In such a case, the system manager 108 may identify the closest driver 204 to the pick-up location 202 as the first driver.

In one or more embodiments, the system manager 108 identifies the first driver based on alternative or additional factors, such as a rider preference (e.g., a preference for a premium style car or a car with a minimum number of available seats), a driver rating, or any other factors relevant to identifying a first driver. As used herein, the terms "driver rating" and "rider rating" refer to a representation of a score attributed to the driver or rider, respectively. A driver rating typically represents scores attributed to the driver by riders, but may also include scores attributed by the transportation system. Similarly, a rider rating typically represents scores attributed to the rider by drivers, but may also include scores from the transportation system. The ratings associated with the driver or rider may represent an aggregated score or an average score representing scores received throughout the entirety of the driver's or rider's association with the particular transportation system or throughout a predetermined previous time period (e.g., the last year).

Subsequently, the system manager 108 determines the probability that the first driver (e.g., the closest driver 204) will accept the ride request if the request is assigned to that driver and an estimated time-to-arrival for the first driver (i.e., the amount of time for the driver to arrive at the pickup location upon accepting the request). Additional detail for determining the acceptance probability will be discussed in more detail below with reference to FIGS. 5A-5C.

In one or more embodiments, the system manager 108 additionally determines an alternate estimated time-to-arrival value for a driver to whom the ride request will be re-assigned if the first driver is assigned the request and rejects it. FIG. 2 illustrates one approach in which the alternate estimated time-to-arrival is determined to be the estimated time to arrival of the next closest driver to the pick-up location (e.g., the second closest driver 206) from the group of available drivers. In other words, the system manager 108 identifies the second closest driver 206 as the re-assigned driver before the first assignment is even made. Under this approach, the alternate estimated time-to-arrival is the approximate time for the second closest driver 206 to travel to the pick-up location 202 upon re-assignment of the ride request.

In one or more alternative embodiments, the system manager 108 determines the alternate time-to-arrival using a combination of the first driver's estimated time-to-arrival and the estimated time-to-arrival values for one or more other nearby drivers. For example, in one or more embodiments, this approach may include using the estimated time to arrival values for all drivers previously identified as available to fulfill the ride request. For example, referring to FIG. 2, the system manager 108 may determine the alternate estimated time-to-arrival using a combination of the estimated time-to-arrival of the closest driver 204 (identified as the first driver) and the estimated time-to-arrival values for the second closest driver 206 and the third closest driver 208.

In some embodiments, the system manager 108 may determine the alternate estimated time to arrival based on an assumption of a steady-state system. In a steady-state system, all alternate drivers are assumed to remain available to fulfill the ride request upon rejection of the request by the first driver or, otherwise, that new drivers will be available to replace those drivers if they are no longer available. Accordingly, for example, when a steady-state is assumed, the system manager 108 can determine the alternate estimated time-to-arrival using a combination of the estimated time-to-arrival for the first driver and the estimated time-to-arrival values of only a subset of the drivers previously identified as available to fulfill the ride request.

In one or more alternative embodiments, the system manager 108 determines the alternate estimated time-to-arrival without using the estimated time-to-arrival values for other nearby drivers. Instead, the alternate estimated time-to-arrival is given a value equal to the expected time-to-arrival. This approach will be discussed in more detail with reference to FIG. 5A.

Referring back to FIG. 2, the system manager 108 then determines the expected time-to-arrival associated with the first driver (e.g., the closest driver 204). In one or more embodiments, the system manager 108 determines the expected time-to-arrival based on the acceptance probability of the first driver, the estimated time-to-arrival for the first driver, and the alternate estimated time-to-arrival associated with the re-assigned driver. In one or more embodiments, the system manager 108 further determines the expected time-to-arrival based on system delays (e.g., time required to notify the first driver of the ride request, time the system manager 108 will wait for a response from the first driver, the time required for re-assignment upon rejection of the ride request, etc.). The system manager 108 may then assign the ride request to the first driver based on the determined expected time-to-arrival. In other words, the closest driver 204 may not be assigned the ride request if the expected time-to-arrival associated with the closest driver 204 is undesirable as compared to the expected time-to-arrival values associated with the other drivers (e.g., second closest driver 206 and/or third closest driver 208) as will be explained in more detail with regards to FIGS. 3A and 3B.

Figures 3A, 3B:
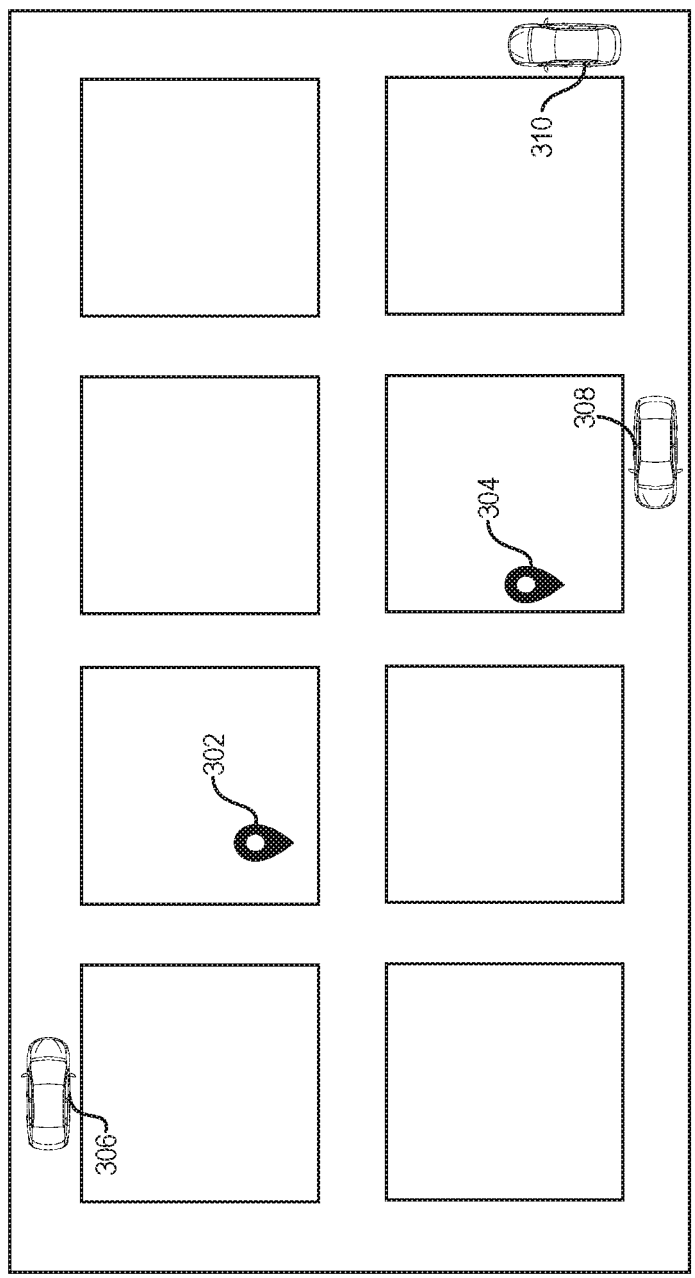
FIG. 3A illustrates an example map of multiple riders requesting a ride in accordance with one or more embodiments.
FIG. 3B illustrates a table comprising expected time-to-arrival values for the rider/driver pairings available in FIG. 3A in accordance with one or more embodiments.

FIG. 3A illustrates an example map of multiple riders requesting rides through the transportation system 106. More particularly, FIG. 3A illustrates an exemplary scenario in which the system manager 108 optimizes assignment of multiple ride requests based on the expected time-to-arrival associated with each available driver for each ride request. For example, as illustrated in FIG. 3A, a first ride request associated with a first pick-up location 302 and a second ride request associated with a second pick-up location 304 may be submitted simultaneously or in temporal proximity to one another so that the system manager 108 operates to assign both requests at or near the same time. Upon receiving the first and second ride requests, the system manager 108 identifies one or more drivers available to fulfill one or both of the requests (e.g., driver_A 306, driver_B 308, and driver_C 310). Subsequently, the system manager 108 determines the expected time-to-arrival associated with each driver with respect to each of the ride requests and assigns drivers to the requests based on the determined expected time-to-arrival values to satisfy an optimization metric.

By way of example, after having received the first ride request associated with the first pick-up location 302 and the second ride request associated with the second pick-up location 304, and identifying driver_A 306, driver_B 308, and driver_C 310 as available drivers, the system manager 108 determines an expected time-to-arrival associated with driver_A 306 with respect to each request. Specifically, the system manager 108 determines a first expected time-to-arrival associated with driver_A 306 with respect to the first ride request and a second expected time-to-arrival associated with driver_A 306 with respect to the second ride request. With regards to the first ride request associated with the first pick-up location 302, the system manager 108 identifies driver_A 306 as the first driver. The system manager 108 then determines a probability that driver_A 306 will accept the first ride request (i.e., acceptance probability) and an estimated time that would be required by driver_A 306 to travel to the first pick-up location 302 upon acceptance of the first ride request (i.e., estimated time-to-arrival).

Additionally, the system manager 108 determines an alternate estimated time-to-arrival associated with a re-assigned driver who may or may not be identified at the time of determination. As illustrated in FIG. 3A, the system manager 108 may determine the alternate estimated time-to-arrival to be the estimated time-to-arrival of driver_B 308 because driver_B 308 is the second closest driver to the first pick-up location 302. In one or more embodiments, the system manager 108 determines the alternate estimated time-to-arrival to be a combination of the estimated time-to-arrival for driver_A 308 (as the first driver) and the estimated time-to-arrival values for driver_B 308 and driver_C 310 (as the other nearby available drivers). In one or more alternative embodiments, the system manager 108 implicitly determines the alternate estimated time-to-arrival without using the estimated time-to-arrival values of any other drivers.

Based on the acceptance probability of driver_A 306 with respect to the first ride request, the estimated time-to-arrival, and the alternate estimated time-to-arrival, the system manager 108 determines a first expected time-to-arrival associated with driver_A 306 with respect to the first ride request. In one or more embodiments, the system manager 108 may further account for system delays when determining the expected time-to-arrival. Additionally, the system manager 108 determines a second expected time-to-arrival associated with driver_A 306 with respect to the second ride request. Similarly, the system manager 108 determines expected time-to-arrival values associated with driver_B 308 and driver_C 310 with respect to each of the first and second ride requests.

FIG. 3B illustrates a table comprising exemplary expected time-to-arrival values for each rider/driver pairing available in FIG. 3A as determined by the system manager 108. As discussed above, the system manager 108 determines the expected time-to-arrival associated with an identified first driver with respect to a ride request based on the first driver's probability of accepting the ride request, the first driver's estimated time-to-arrival upon acceptance of the request, and the alternate estimated time-to-arrival associated with a driver to whom the ride request will be re-assigned upon rejection by the first driver. Additionally, the system manager 108 may account for system delays in its determination.

For illustration purposes, driver_A 306 has a low probability of acceptance for both ride requests while driver_B 308 and driver_C 310 both have very high probabilities of acceptance for both requests. Additionally, the value of system delays (also referred to as the "lapse time") is determined to be constant across all rider/driver pairings. Notably, due to driver_A's 306 low probability of accepting ride requests, the expected time-to-arrival associated with driver_A 306 with respect to the first ride request is relatively large compared to driver_A's 306 close proximity to the first pick-up location 302. Further, even though driver_A 306 is closer to the first pick-up location 302 than the second pick-up location 304, the expected time-to-arrival associated with driver_A 306 with respect to the first pick-up location 302 is relatively larger because driver_A's 306 probability of accepting the first ride request is even lower than the probability of accepting the second ride request. In other words, in one or more embodiments, a driver may have a different probability of accepting different ride requests. Specifically, one rider/driver pairing may be less favorable than another rider/driver pairing and result in a higher likelihood of rejection.

After the system manager 108 determines expected time-to-arrival values for each possible rider/driver pairing, the system manager 108 assigns drivers to the ride requests based on the determined expected time-to-arrival values to satisfy an optimization metric. For example, in one or more embodiments, the system manager 108 optimizes the assignment of rides based on which rider/driver pairings provide the lowest sum total expected time-to-arrival value. In particular, the system manager 108 analyzes all possible rider/driver pairing combinations available (e.g., assign driver_A 306 the first request and driver_B 308 the second request; assign driver_A 306 the first request and driver_C 310 the second request, etc.). For a particular rider/driver pairing combination, the system manager 108 adds the expected time-to-arrival values associated with each rider/driver pairing to obtain a sum total expected time-to-arrival value. Subsequently, the system manager 108 compares all sum total expected time-to-arrival values for each possible combination of rider/driver pairings and assigns rides based on which combination of rider/driver pairings provides the lowest value. Based on the results displayed in FIG. 3B, the system manager 108 would assign the first ride request to driver_B 308 and the second ride request to driver_C 310, because this particular rider/driver pairing combination has the lowest sum total expected time-to-arrival value. In one or more alternative embodiments, the system manager 108 optimizes assignment of rides based on which rider/driver pairings provide the lowest weighted sum total expected time-to-arrival value in which some requests are assigned a larger weight than others based on the type of request (e.g., primetime, conversion probability, etc.)

FIGS. 3A and 3B additionally illustrate one of the optimization benefits provided by the system manager 108. Analyzing the proximity of driver_A 306 to the first pick-up location 302 and of driver_B 308 to the second pick-up location, a conventional transportation system may assign the first ride request to driver_A 306 and the second ride request to driver_B under the assumption that the proximity of each drivers' current location to their respective assigned pick-up location would provide the best optimization (e.g., lowest sum total request-to-pick-up time). However, if driver_A 306 rejects the first ride request (either affirmatively or through driver lapse), then the system would have to re-assign the first ride request to driver_C 310 (the farthest driver away from the first pick-up location 302) because driver_B 308 (the second closest driver to the first pick-up location 302) was already assigned the second ride request.

Consequently, the conventional transportation system's optimization fails, causing the request-to-pick-up time for the first ride request (as well as the sum total request-to-pick-up time) to increase significantly.

In contrast, by determining an expected time-to-arrival based on driver_A's 306 low acceptance probability, the system manager 108 avoids assigning a ride request to driver_A 306 and, thus, avoids the likelihood of extra delays caused by the rejection. Therefore, the system manager 108 optimizes ride assignment more effectively by balancing a driver's proximity to a pick-up location with the probability that the driver will cause delays by rejecting the request.

Figure 4A:
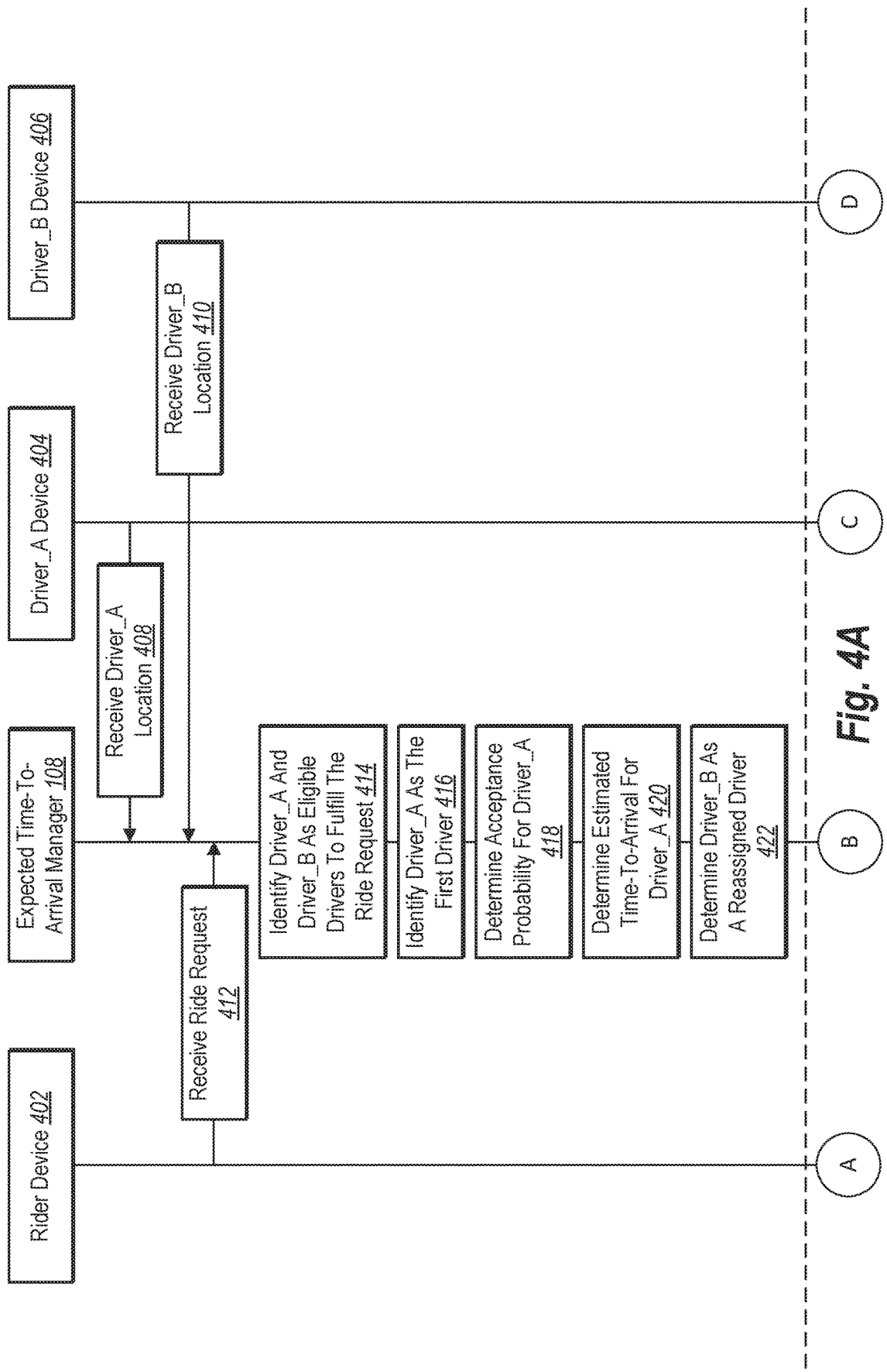
FIGS. 4A-4B illustrate a sequence diagram of the operation of a system manager in accordance with one or more embodiments.
Figure 4B:
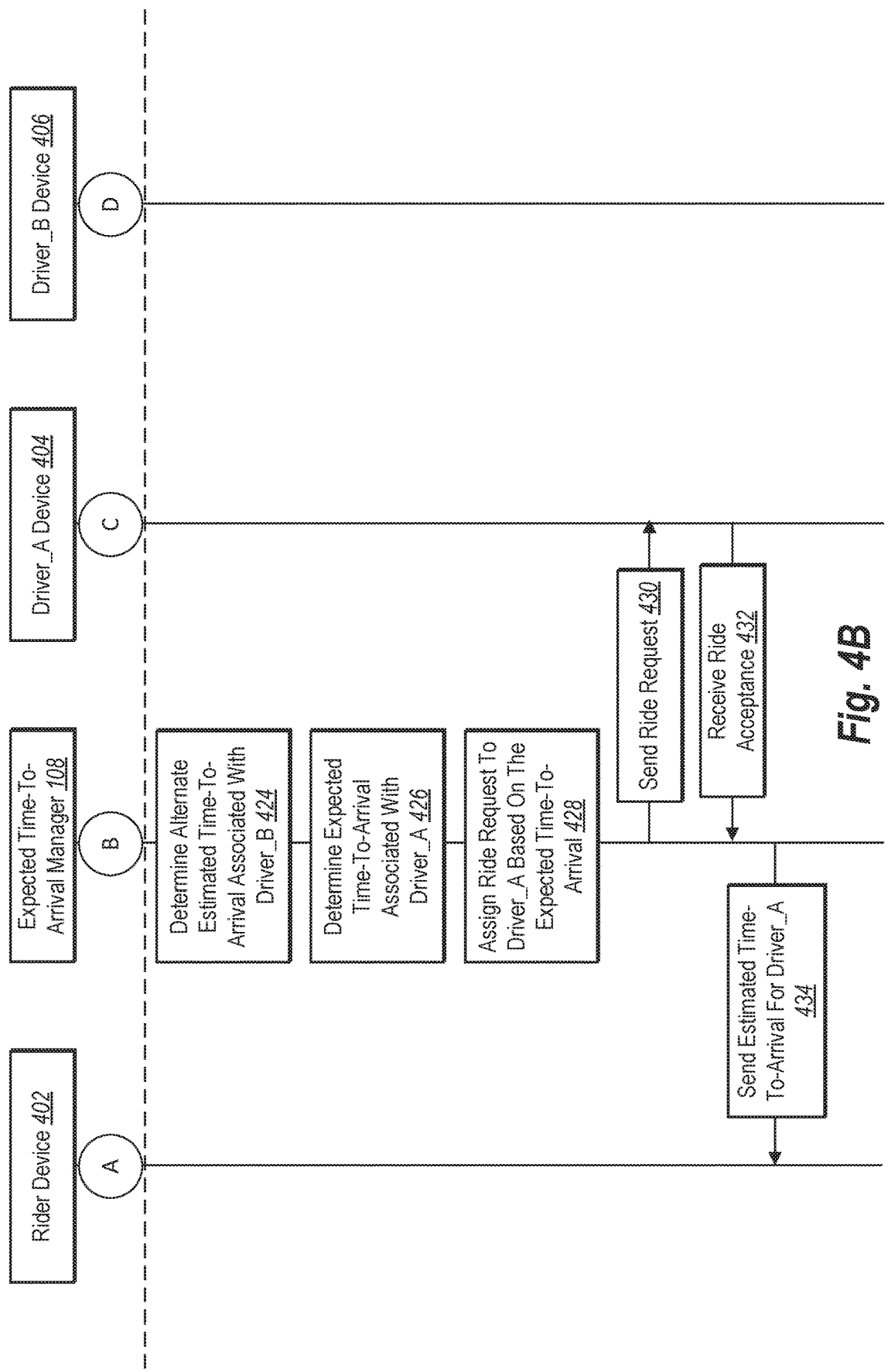

FIGS. 4A-B illustrate a sequence diagram 400 of one or more embodiments in which a system manager 108 communicates with a rider device 402, a driver_A device 404, and a driver_B device 406. In one or more embodiments, the rider device 402 is one of the rider devices 116a-116n illustrated in FIG. 1. Additionally, the driver_A device 404 and the driver_B device 406 may comprise the driver device 110 illustrated in FIG. 1.

As shown in FIG. 4A, the system manager 108 receives driver_A's location (408) from the driver_A device 404 and receives driver_B's location (410) from the driver_B device 406. In particular, the locations of driver_A and driver_B relate to the current locations of the driver_A device 404 and the driver_B device 406, respectively. Further, though FIG. 4A illustrates one instance of the system manager 108 receiving locations for driver_A and driver_B, the system manager 108 may receive driver locations for each driver constantly or at a predetermined rate in order to always maintain the current location of each driver.

As illustrated in FIG. 4A, the system manager 108 also receives a ride request (412) from the rider device 402. In general, a ride request may comprise information relevant to the ride, such as a pick-up location. In particular, the pick-up location may correspond to the current location of the rider (i.e., the current location of the rider device 402) at the time the rider submits the ride request. Additionally, or alternatively, the rider may manually enter a pick-up location via the ride request application 118. For example, the rider may submit a request for a future ride (e.g., a ride for the next day) and provide a desired pick-up location when submitting the request.

After, receiving the ride request (412), the system manager 108 identifies driver_A and driver_B as available drivers to fulfill the ride request (414). In one or more embodiments, driver_A and driver_B are determined to be available based on their current locations. For example, the system manager 108 may identify driver_A and driver_B as available to fulfill the ride request because their current locations are close to the pick-up location associated with the ride request (i.e., within a distance or travel time threshold of the pick-up location). Alternatively, the system manager 108 may identify driver_A and driver_B as available because their current locations are the closest to the pick-up location associated with the ride request. In other words, though there may be a plurality of users within a distance or travel time threshold of the pick-up location, driver_A and driver_B may be identified as the closest.

As illustrated in FIG. 4A, the system manager 108 then identifies driver_A as the first driver (416). In one or more embodiments, the system manager 108 identifies driver_A as the first driver based on one or more characteristics of the ride request. For example, the system manager 108 may identify driver_A as the first driver because driver_A is the closest driver to the pick-up location associated with the ride request. Alternatively, the system manager 108 may identify driver_A as the first driver (416) based on alternative or additional factors, such as a rider preference (e.g., a preference for a premium style car or a car with a minimum number of available seats), a driver rating, or the number of driver rejections or accepts over a recent time period (e.g., one hour).

After identifying driver_A as the first driver, the system manager 108 determines an acceptance probability for driver_A (418) with respect to the ride request. Determining the acceptance probability will be discussed in additional detail with regard to 5A-5C. Additionally, the system manager 108 determines an estimated time-to arrival for driver_A (420), as discussed above.

As further illustrated in FIG. 4A, the system manager 108 also identifies driver_B as an alternate or reassigned driver (422) (i.e., the driver to whom the ride request may be reassigned upon rejection by driver_A). In one or more embodiments, the system manager 108 identifies driver_B as the re-assigned driver (422) based on one or more characteristics of the ride request. For example, the system manager 108 may identify driver_B as the re-assigned driver (422) because driver_B is the second closest driver to the pick-up location associated with the ride request.

Continuing on to FIG. 4B, the system manager 108 determines an alternate estimated time-to-arrival associated with driver_B (424). As shown in FIG. 4A, the system manager 108 determines the alternate estimated time-to-arrival to be the estimated time-to-arrival for the second closest driver to the pick-up location associated with the ride request. In one or more alternative embodiments, the system manager 108 determines the alternate estimated time-to-arrival using a combination of the first driver's estimated time-to-arrival and the estimated time-to-arrival values for one or more nearby drivers. In such a scenario, the system manager 108 would determine the alternate estimated time-to-arrival using a combination (e.g., average or weighted average) of the estimated time-to-arrival for driver_A (as the first driver) and the estimated time-to-arrival value for driver_B. In one or more other embodiments, the system manager 108 determines the alternate estimated time-to-arrival without using the estimated time-to-arrival values for other nearby drivers. Instead, the alternate estimated time-to-arrival is given a value equal to the expected time-to-arrival, as explained further below.

Subsequently, the system manager 108 determines an expected time-to-arrival associated with driver_A (426). More specifically, the system manager 108 determines the expected time-to-arrival associated with driver_A (426) based on the acceptance probability of driver_A, the estimated time-to-arrival of driver_A, and the alternate estimated time to arrival associated with driver_B. The system manager 108 then determines to assign the ride request to driver_A based on the expected time-to-arrival (428).

The system manager 108 then sends the ride request (430) to the driver_A device 404. Subsequently, the system manager 108 receives a ride request acceptance (432) from the driver_A device 404. After receiving the ride request acceptance (432), the system manager 108 sends the estimated time-to-arrival for driver_A (434) to the rider device 402.

Figure 4C:
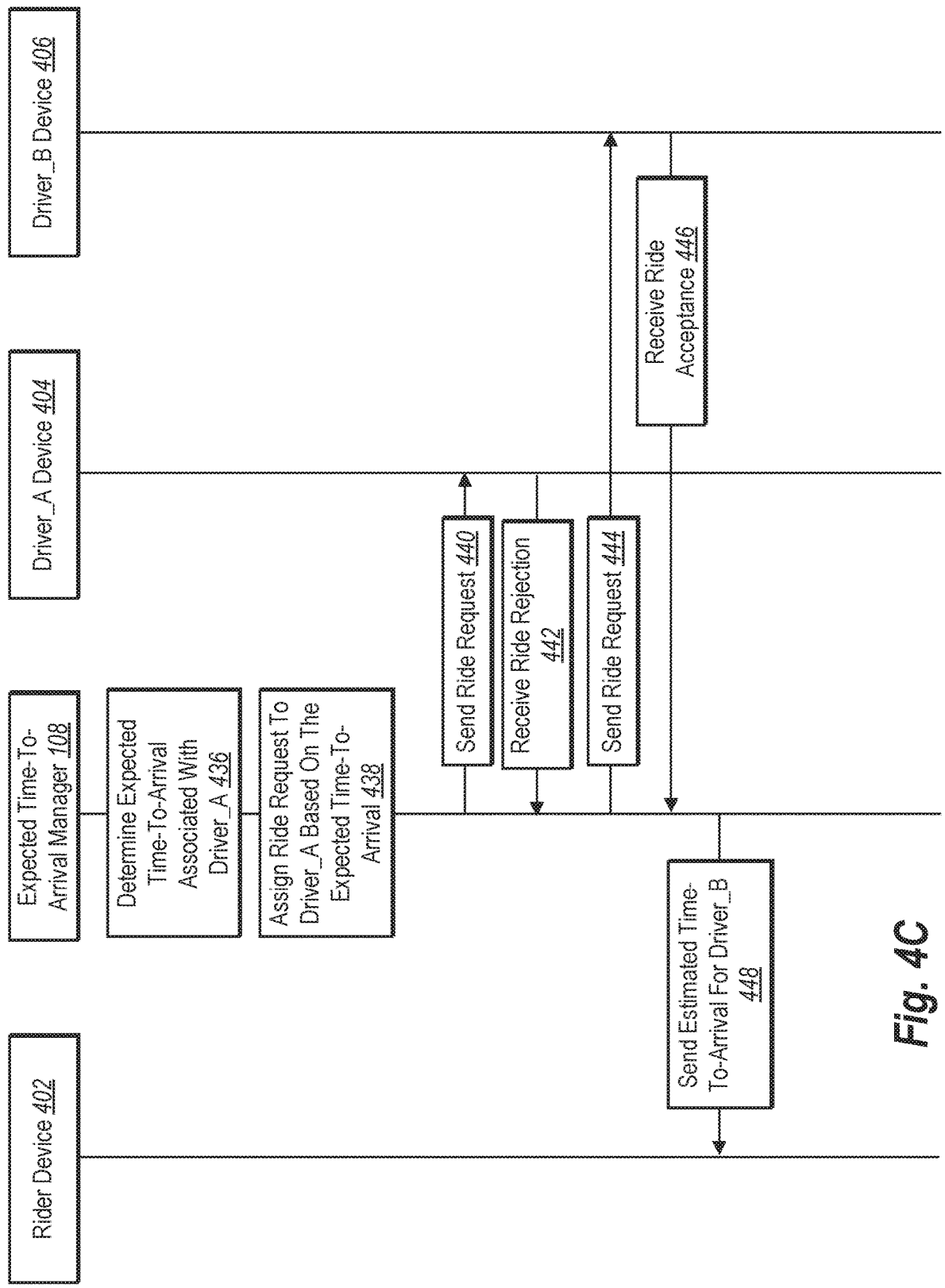
FIG. 4C illustrates another sequence diagram of the operation of a system manager in accordance with one or more embodiments.

FIG. 4C illustrates another sequence diagram, similar to that shown in FIGS. 4A-B, but in which the first assigned driver rejects the ride request. All acts shown in FIGS. 4A-B leading up to determining the expected time-to-arrival associated with driver_A (426) still apply. As shown in FIG. 4C, the system manager 108 determines the expected time-to-arrival associated with driver_A (436) and assigns the ride request to driver_A based on the expected time-to-arrival (438). Subsequently, the system manager 108 sends the ride request (440) to the driver_A device 404. As shown in FIG. 4C, the system manager 108 receives a ride rejection (442) from the driver_A device 404. After receiving the ride rejection (442), the system manager 108 sends the ride request (444) to the driver_B device 406 and receives a ride acceptance (446) from the driver_B device 406 in return. After receiving the ride acceptance (446) from the driver_B device 406, the system manager 108 sends the estimated time-to-arrival for driver_B (448) to the rider device 402.

FIG. 4C illustrates another advantage of the system manager 108 over conventional transportation systems. In particular, the system manager 108 provides more accurate information to a rider regarding the request-to-pick-up time. By taking into account the probability that the first assigned driver (e.g., driver_A) will reject the ride request and any extra time delays caused by the rejection, the system manager 108 presents to the rider a time interval within which the rider can expect a driver (not necessarily the first assigned driver) to arrive at the pick-up location. In other words, even though driver_A rejected the ride request, the expected time-to-arrival sent to the rider device 402 remains relatively accurate, because it already accounts for the possibility of rejection.

In some embodiments, the actual time within which a driver arrives at the pick-up location is within an acceptable range of the expected time-to-arrival regardless of whether the first assigned driver accepts or rejects the ride request. An acceptable range can be system defined, user defined, driver defined, and/or dynamically defined based on the transportation system's load. For instance, an acceptable range can be between plus or minus 10 seconds, 30 seconds, one minute, three minutes, or more depending on a particular setting and/or system capacity levels. Therefore, the system manager 108 provides more accurate information in that an event where a driver arrives at the pick-up location after the expected time-to-arrival has expired is unlikely.

Figure 5A:
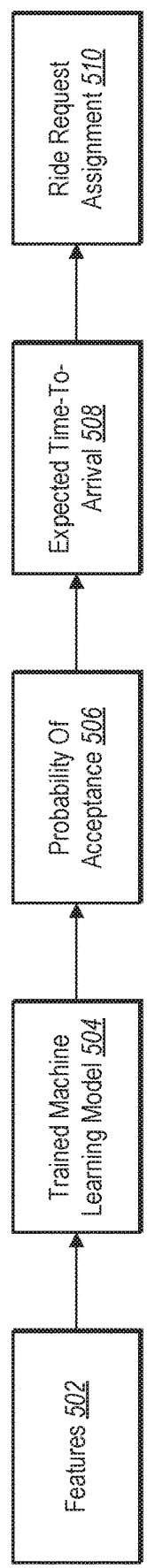
FIG. 5A illustrates a block diagram of a machine learning model used to indirectly determine an expected time-to-arrival in accordance with one or more embodiments.

FIG. 5A illustrates a block diagram representing one or more embodiments in which the system manager 108 determines the acceptance probability of the first driver using a trained machine learning model. In particular, a driver's probability of acceptance quantifies whether the driver is a good match for the ride request. There may be various reasons why a driver is not a good match for a ride request. For example, the driver may not be a good match for the ride request due to the pick-up or drop-off location associated with the request, the timing of the request, system error, rider rating, etc. The system manager 108 operates to provide a driver ride requests that are of most interest to the driver; therefore, using the probability of acceptance allows for more efficient and effective matching of ride requests with drivers. As used herein, a "machine learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to a neural network (e.g., a convolutional neural network or deep learning), a decision tree (e.g., a gradient boosted decision tree), association rule learning, inductive logic programming, support vector learning, Bayesian network, regression-based model, principal component analysis, or a combination thereof.

In particular, the system manager 108 trains a machine learning model to determine an acceptance probability using a set of features associated with past ride requests. In one or more embodiments, the machine learning model comprises a gradient boosted decision tree classifier. In one or more alternative embodiments, the machine learning model comprises any other appropriate classifier (e.g., a logistic regression classifier, a support vector machine, classifiers based on nearest neighbor methods, boosting classifiers, decision trees, random forests, neural networks, etc.) The set of features may comprise any appropriate feature found to impact a given driver's probability of acceptance. Alternatively, the set of features may comprise only those features satisfying a threshold impact metric or those features having the most impact on the acceptance probability.

Examples of features include the exponentially weighted mean accept rate of the driver, the estimated time-to-arrival of the driver, the estimated time-to-arrival of the next nearest driver (i.e., next nearest to the pick-up location), the number of recent accepts by the driver (e.g., over the last one-hour period), the number of recent lapses or rejections by the driver (e.g., over the last one-hour period), the latitude and longitude of the pick-up location associated with the ride request, the hour of the day, the day of the week, a primetime bonus (e.g., driver/rider incentives) associated with the ride request, the rating of the rider associated with the request, and/or whether or not the driver is in destination mode. Therefore, the driver may potentially accept or reject a ride request based on whether the driver is willing to travel to that particular destination location.

As used herein, the term "destination mode" refers to a mode in which a driver receives a destination location associated with a ride request before the driver accepts or rejects the request. As used herein, the term "primetime" refers to a period of time designated as distinct from other periods of time in which riders may submit ride requests. In particular, primetime refers to a period of time in which the demand for rides is greater than the number of drivers available to fulfill requests. For example, a period of time encapsulating the time leading up to or immediately after a special event, such as a convention or a sporting event, may be designated if the number of attendees requesting a ride is larger than the number of drivers on the road.

Through the training process, the machine learning model determines the degree to which each feature impacts a given driver's acceptance probability. The system manager 108 can develop a model for individual drivers, groups of similar drivers (e.g., within the same city), or drivers across the entire transportation system.

Subsequently, the system manager 108 uses the trained machine learning model 504 to determine the acceptance probability of a driver identified as the first driver for a current ride request. In particular, the system manager 108 applies a set of features 502 associated with a current ride request to the trained machine learning model 504. In one or more embodiments, the set of features 502 comprises the same features used in training the machine learning model, except that the set of features 502 are associated with a current ride request. After applying the set of features 502, the trained machine learning model 504 outputs a probability of acceptance 506 for the first driver.

Based on the probability of acceptance 506, the system manager 108 determines the expected time-to-arrival 508 associated with the first driver. In general, the system manager 108 determines the expected time-to-arrival using the following equation:

$$\text{expected\_eta} = p \cdot \text{driver\_eta} + (1-p) \cdot (\text{lapse\_time} + \text{alternate\_eta}) \quad (1)$$

In the equation above, p represents the probability of acceptance 506 for the identified first driver as determined by the trained machine learning model 504, and driver_eta refers to the estimated time to arrival for the first driver. Additionally, lapse_time refers to time delays incurred by the system manager 108 to assign and/or re-assign a ride request. In other words, lapse_time includes a delay caused by the system in response to a ride rejection. For example, the lapse_time may include, but is not limited to, the time needed to notify a driver of a ride request, the time the system manager 108 will wait for a response from the driver assigned to the ride, and any time required for re-assignment of the ride request upon rejection by the first assigned driver.

Lastly, alternate_eta is the value of the estimated time-to-arrival associated with a driver to whom the ride request may be re-assigned upon rejection by the identified first driver (i.e., the alternate estimated time-to-arrival).

Because the re-assigned driver may or may not be known at the time the system manager 108 determines the value of alternate_eta, there are multiple approaches to determining this value. In one or more embodiments, the system manager 108 determines alternate_eta by identifying a second driver based on one or more characteristics of the ride request. For example, the system manager 108 may identify the next nearest driver (e.g., second closest driver to the pick-up location where the identified first driver is the closest driver to the pick-up location) as the second driver. Subsequently, the system manager 108 determines the time that would be required by the second driver to travel from the second driver's location at the time the ride request is re-assigned to the selected pick-up location. The determined time becomes the value of alternate_eta. This approach to determining the value of alternate_eta assumes that the second driver will still be available to fulfill the request upon rejection by the first driver. If the second driver is no longer available to fulfill the request (e.g., was assigned another ride), other measures would be required. For example, the system manager 108 may re-assign the ride request to the then next closest available driver.

In one or more other embodiments, the value of alternate_eta is determined using a combination of the first driver's estimated time-to-arrival and the estimated time-to-arrival values for one or more nearby drivers. For example, the system manager 108 may identify four drivers near the pick-up location associated with the ride request (e.g., within a distance threshold or travel time threshold of the pick-up location) as available drivers to fulfill the ride request. Subsequently, the system manager 108 may identify the closest driver as the first driver. Therefore, the system manager 108 may determine the value of alternate_eta using a combination of the estimated time-to-arrival for the first driver and the estimated time-to-arrival values for the other three drivers. In one or more embodiments, the system manager 108 may assign a weight to the estimated time-to-arrival values for the first driver and the one or more nearby drivers. In other embodiments, the system manager 108 only uses a combination of the estimated time-to-arrival for the first driver and the estimated time-to-arrival values for a subset of the other nearby drivers (e.g., only the second closest driver and the third closest driver).

In one or more alternative embodiments, the system manager 108 determines the value of alternate_eta without using the estimated time-to-arrival values for any nearby drivers. Under this approach, the system manager 108 assigns the value of alternate_eta to be equal to the value of expected_eta. By making these values equal, the system manager 108 preserves the order between expected_eta and alternate_eta regardless of the actual value of alternate_eta. Assuming the value of the alternate_eta to be equal to the value of expected_eta, equation (1) from above results in the following equation:

$$\text{expected\_eta} = \text{driver\_eta} + (1/p - 1)\text{lapse\_time} \quad (2)$$

Setting the value of alternate_eta to the value of expected_eta allows the system manager 108 to determine the expected time-to-arrival without depending on the assumptions used by the other approaches under equation 1 and regardless of the identity of the re-assigned driver. Similar to equation 1, as the value of p increases (i.e., the identified first driver has a higher probability of accepting the ride request), the second term of the equation decreases resulting in an expected_eta value that approaches the value of driver_eta. Conversely, as the value of p decreases, then the value of expected_eta increases due to the higher likelihood that the system manager 108 will have to re-assign the ride request.

Referring back to FIG. 5A, the system manager 108 uses the expected time-to-arrival 508 to determine a ride request assignment 510. In other words, the system manager 108 will assign the ride request to the first driver based on the expected time-to-arrival. For example, where the system manager 108 receives a single ride request and identifies a plurality of drivers available to fulfill the request, the system manager 108 determines the expected time-to-arrival for each available driver. The system manager 108 then compares the expected time-to-arrival values of each available driver and assigns the ride request to the driver associated with the lowest expected time-to-arrival. Thus, the system manager 108 will not assign the ride request to the driver closest to the pick-up location associated with the request if that driver's expected time-to-arrival value is higher than one of the other nearby available drivers. Because the expected time-to-arrival of a driver depends on the probability of that driver accepting the ride request, the system manager 108 may avoid assigning ride requests to drivers with low acceptance probabilities; thus, the system manager 108 minimizes the need to re-assign requests.

Where the system manager 108 receives multiple ride requests simultaneously or in temporal proximity to one another so as to require assignment of the requests at or near the same time, the system manager 108 determines the expected time-to-arrival associated with each available driver with respect to each of the ride requests and assigns drivers to the requests based on the determined expected time-to-arrival values to satisfy an optimization metric. As an example, referring back to FIG. 3A, when multiple requests are received, the system manager 108 determines the expected time-to-arrival values for each possible rider/driver pairing (e.g., driver_A 306 with respect to the first ride request, driver_A 306 with respect to the second ride request, driver_B 308 with respect to the first ride request, etc.). The system manager 108 then determines a sum total expected time-to-arrival value for each possible combination of rider/driver pairings (e.g., assign driver_A 306 the first request and driver_B 308 the second request; assign driver_A 306 the first request and driver_C 310 the second request, etc.). Subsequently, the system manager 108 compares all sum total expected time-to-arrival values for each possible combination of rider/driver pairings and assigns rides based on which combination of rider/driver pairings has the lowest sum total expected time-to-arrival value.

In one or more embodiments, the system manager 108 determines the probability of acceptance for the first driver using heuristic methods. In particular, the system manager 108 determines a probability metric associated with the first driver and then determines the probability of acceptance based on the probability metric. As used herein, the term "probability metric" refers to a measurable attribute that is indicative of, or contributory to, the probability that an event will or will not happen. For example, in the context of determining the probability of whether a driver assigned a ride request will accept the request, a probability metric may be any measurable attribute that may be used to determine that probability. The probability of acceptance may then be used to determine the expected time-to-arrival associated with the first driver. One or more embodiments under this approach will be discussed below.

Figure 5B:
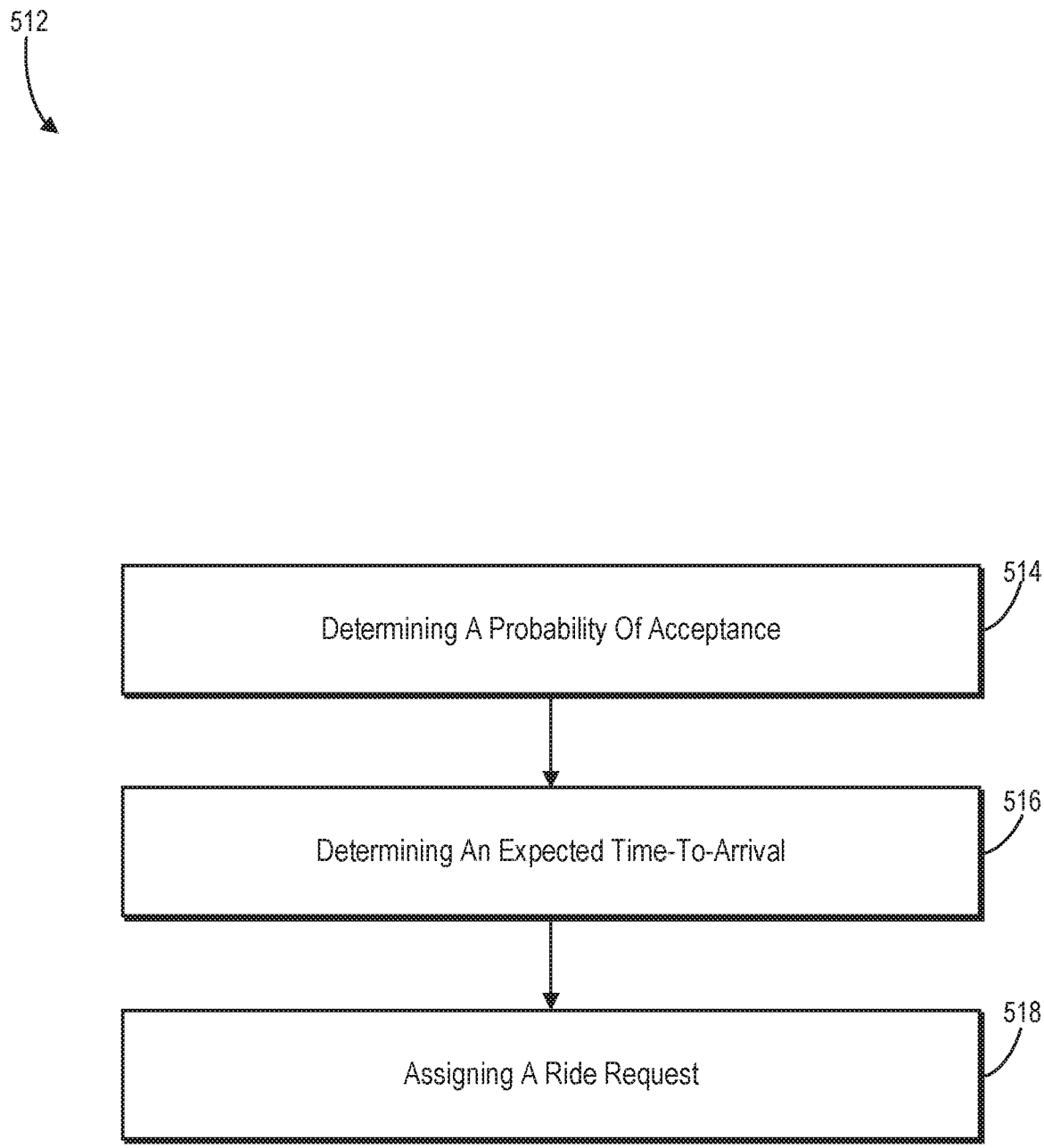
FIG. 5B illustrates an example flowchart to determine and implement a probability of acceptance in accordance with one or more embodiments.

FIG. 5B illustrates a flowchart of a series of acts 512 of using a probability of acceptance determined with heuristics to determine an expected time-to-arrival in accordance with one or more embodiments. As used herein, "heuristics" or "heuristic methods" refers to an approach to problem solving that employs efficient rules learned and/or hard-coded by evolutionary processes. In general, heuristics employ strategies derived from previous results with similar problems.

While FIG. 5B illustrates acts according to one embodiment, alternative embodiments may omit, add to, reorder, and/or modify any of the acts shown in FIG. 5B. The acts of FIG. 5B can be performed as part of a method. In one or more embodiments, a non-transitory computer readable storage medium can comprise instructions that, when executed by one or more processors, cause a computing device to perform the acts of FIG. 5B. In still further embodiments, a system can perform the acts of FIG. 5B.

The series of acts 512 includes an act 514 of determining a probability of acceptance. Broadly speaking, the system manager 108 operates to efficiently match ride requests to drivers and uses a driver's probability of acceptance to do so. In particular, a driver's probability of acceptance quantifies whether the driver is a good match for the ride request. There may be various reasons why a driver is not a good match for a ride request (e.g., pick-up or drop-off location, timing of the request, etc.). Whatever the reason, a bad match may lead to a rejection and associated delays. Using heuristics to determine the probability of acceptance allows the system manager 108 to quickly determine whether a driver is a good match for a ride request, avoiding any unnecessary rejections. Consequently, the system manager 108 improves the efficiency of providing driver with ride requests that are a good match for the driver.

In one or more embodiments, the act 514 involves determining the probability that the first driver will accept the ride request based on the driver's average accept rate. For example, the act 514 may involve determining an average driver accept rate of similar ride requests for the identified first driver as the probability metric to be used in determining the first driver's probability of acceptance. In some embodiments, the average driver accept rate may comprise an average accept rate of the first driver over a predetermined previous time period (e.g., the last twenty-four hours). For example, if the first driver accepted half of the ride requests over the twenty-four hours preceding the current ride request, the system manager 108 would determine the driver's average accept rate to be 0.5 accepts/hour (or any comparable unit deemed appropriate). In one or more embodiments, the system manager 108 makes a direct correlation between the first driver's average accept rate and the driver's probability of acceptance. Using the example above, the system manager 108 would determine the first driver to have a probability of acceptance of 0.5.

In one or more alternative embodiments, the act 514 involves determining the probability that the first driver will accept the ride request based on the driver's exponentially weighted average accept rate. For example, the act 514 may involve determining a weighted average driver accept rate of the identified first driver as the probability metric to be used in determining the first driver's probability of acceptance. In one or more embodiments, the system manager 108 determines the exponentially weighted average driver accept rate over the course of the first driver's history as a driver in association with the transportation system 106 or, additionally, as a driver in association with competitor transportation systems. Alternatively, the system manager 108 determines the exponentially weighted average driver accept rate over a predetermined previous period of time (e.g., the last year). Further, in one or more embodiments, the system manager 108 assigns more weight to acceptances that are more recent. Alternatively, the system manager may assign more weight to older acceptances.

The series of acts 512 also includes an act 516 of determining an expected time-to-arrival. For example, the act 516 involves determining an expected time-to-arrival associated with the first driver based on the probability of acceptance. In particular, the system manager 108 determines the expected time-to-arrival associated with the first driver using one of the approaches described above with reference to FIG. 5A. The series of acts 512 also includes an act 518 of assigning a ride request. For example, the act 518 involves assigning the ride request to the first driver based on the determined expected time-to-arrival.

While the above figures illustrate the system manager 108 determining an acceptance probability for a driver, and then using the acceptance probability to determine an expected time-to-arrival, in additional embodiments the system manager 108 directly determines the expected time-to-arrival. For example, the system manager 108 directly determines the expected time-to-arrival by providing a set of features to a trained machine learning model, which then determines a value for the expected time-to-arrival. It will be appreciated that the driver's probability of acceptance is implicitly accounted for in the machine learning model's determination. In particular, the features applied to the trained machine learning model impact the value of the expected time-to-arrival because they contribute (whether positively or negatively) to the probability that first driver will accept the request and, conversely, the probability that the request-to-pick-up time will experience delays due to rejection of the request.

Figure 6:
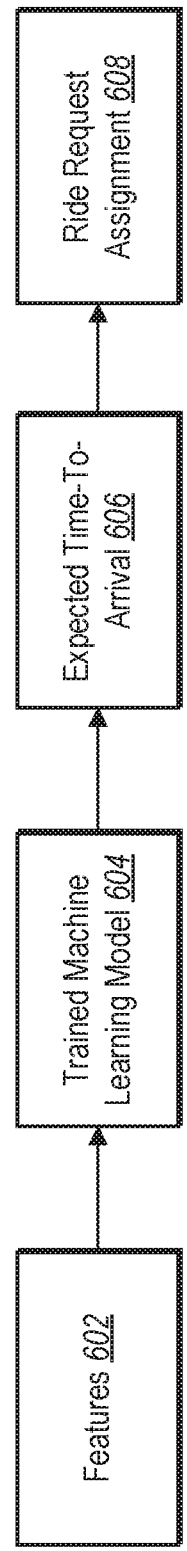
FIG. 6 illustrates a block diagram of a machine learning model used to directly determine an expected time-to-arrival in accordance with one or more embodiments.

FIG. 6 illustrates a block diagram of a machine learning model used to directly determine an expected time-to-arrival in accordance with one or more embodiments. In particular, instead of determining a probability of acceptance for the identified first driver, an estimated time-to-arrival for the first driver, an alternate estimated time-to-arrival associated with the re-assigned driver, and the time used by the system (i.e., the lapse time), the system manager 108 directly determines the expected time-to-arrival associated with the first driver using a machine learning model. In particular, the system manager 108 trains a machine learning model to determine an expected time-to-arrival using a set of features associated with past ride requests. In one or more embodiments, the machine learning model comprises a gradient boosted regression tree model. In one or more alternative embodiments, the machine learning model comprises any other appropriate regressor model (e.g., a Lasso model, a generalized linear model, a linear regression model, a polynomial regression model, a ridge regression model, a local regression model, etc.).

The set of features may comprise any appropriate feature found to impact the expected time-to-arrival associated with a given driver. Alternatively, the set of features may comprise only those features satisfying a threshold impact metric or those features having the most impact on the expected time-to-arrival. Examples of features that may be used include the exponentially weighted mean accept rate of the driver, the estimated time-to-arrival of the driver, the estimated time-to-arrival of the next nearest driver (i.e., next nearest to the pick-up location), the number of recent accepts by the driver (e.g., over the last one-hour period), the number of recent lapses or rejections by the driver (e.g., over the last one-hour period), the latitude and longitude of the pick-up location associated with the ride request, the hour of the day, the day of the week, the primetime experienced by the ride request, the rating of the rider associated with the request, or whether or not the driver is in destination mode. Through the training process, the machine learning model determines the degree to which each feature impacts the expected time-to-arrival associated with a given driver.

Subsequently, the system manager 108 uses the trained machine learning model 604 to determine the expected time-to-arrival associated with a driver identified as the first driver for a current ride request. In particular, the system manager 108 applies a set of features 602 associated with a current ride request to the trained machine learning model 604. In one or more embodiments, the set of features 602 comprises the same features used in training the machine learning model, except that the set of features 602 are associated with a current ride request. After applying the set of features 602, the trained machine learning model 604 outputs an expected time-to-arrival 606 associated with the first driver. Subsequently, the system manager 108 uses the expected time-to-arrival 606 to determine a ride request assignment 608. In other words, the system manager 108 will assign the ride request to the first driver based on the expected time-to-arrival.

It will be appreciated that the trained machine learning model 604 inherently accounts for the probability that the first driver will accept the ride request in its determination of the expected time-to-arrival. In particular, the features applied to the trained machine learning model 604 may impact the resulting expected time-to-arrival because they contribute to the probability that that first driver will accept the request. Therefore, the resulting ride assignment to the first driver is still made based on the probability that the driver will accept the request.

Figure 7:
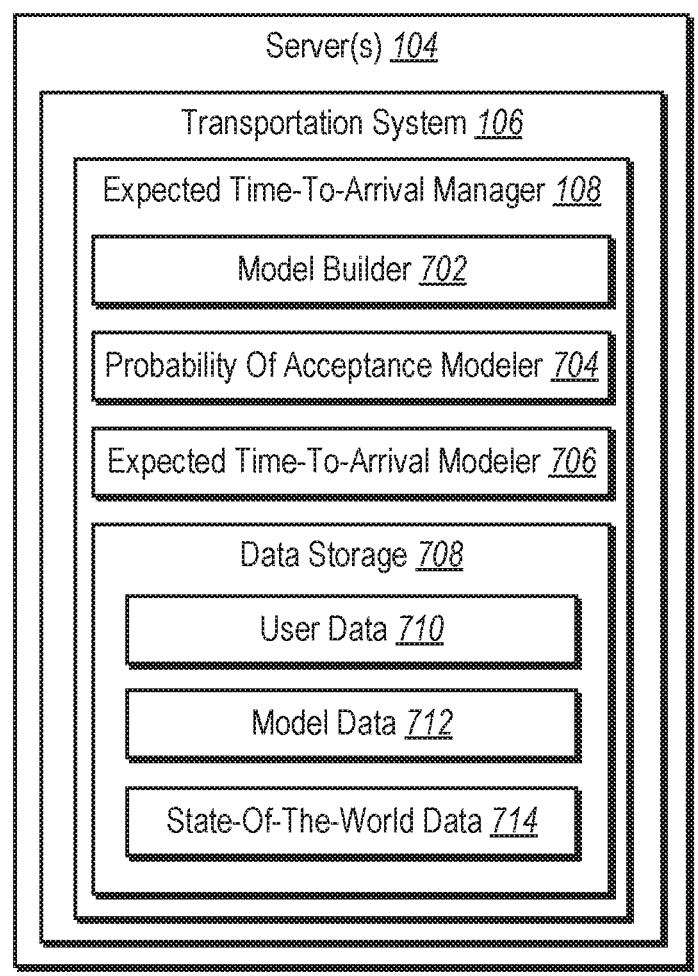
FIG. 7 illustrates an example schematic diagram of a system manager in accordance with one or more embodiments.

FIG. 7 illustrates a detailed schematic diagram of an example architecture of the system manager 108 of FIG. 1. As shown, the system manager 108 can be part of server(s) 104 and transportation system 106. Though not shown, the transportation system 106 can include a subscription system manager, a communication system manager, a map system, and a driver dispatch system. Additionally, the system manager 108 can include, but is not limited to, a model builder 702, a probability of acceptance modeler 704, an expected time-to-arrival modeler 706, and data storage 708.

As mentioned, the transportation system 106 can include a subscription system manager. In particular, the subscription system manager may collect and manage information regarding subscribers to the transportation system 106 (e.g., name information, home/business address, employment/employer, preference information, automobile information, driver/rider rating, payment information, etc.). Subscribers to the transportation system 106 may include users (e.g., drivers and riders) of the transportation system 106. Additionally, the transportation system 106 may include a communication system manager that facilitates communication between the server(s) 104 and the driver and rider devices over a network.

Further, the transportation system 106 may include a map system. In particular, the transportation system 106 may use the map system to map the area associated with a ride request and display the mapping on a display of the assigned driver. For example, the transportation system 106 may receive pick-up locations for ride requests and a current location of one or more drivers as determined by one or more location tracking systems (e.g., GPS). Subsequently, the transportation system 106 may display the pick-up location of the ride request to the assigned driver and may additionally display one or more optional routes for the driver to take in order to arrive at the pick-up location. Additionally, the transportation system 106 may display, to the rider, the assigned driver's position as the driver travels to the pick-up location. Further, the transportation system 106 may include a driver dispatch system which may receive an assignment from the system manager 108 and dispatch the ride assignment and any associated instructions to the assigned driver.

With regard to the system manager 108, in one or more embodiments, each of the components of the system manager 108 are in communication with one another using any suitable communication technologies. Additionally, the components of the system manager 108 can be in communication with one or more other devices including a client device of a user. It will be recognized that although the components of the system manager 108 are shown to be separate in FIG. 7, any of the components may be combined into fewer components, such as into a single component, or divided into more components as may serve a particular implementation. Furthermore, although the components of FIG. 7 are described in connection with the system manager 108, at least some components for performing operations in conjunction with the system manager 108 described herein may be implemented on other devices within the environment.

The components of the system manager 108 can include software, hardware, or both. For example, the components of the system manager 108 can include one or more instructions stored on a computer readable storage medium and executable by processors of one or more computing devices or, alternatively, by servers (e.g., server(s) 104) of a system. When executed by the one or more processors or servers, the computer-executable instructions of the system manager 108 can cause the computing device or system to perform the training and estimation functions described herein. Alternatively, the components of the system manager 108 can comprise hardware, such as a special purpose processing device to perform a certain function or group of functions. Additionally, or alternatively, the components of the system manager 108 can include a combination of computer-executable instructions and hardware.

Furthermore, the components of the system manager 108 performing the functions described herein with respect to the system manager 108 may, for example, be implemented as part of a stand-alone application, as a module of an application, as a plug-in for applications including electronic messaging applications, as a library function or functions that may be called by other applications, and/or as a cloud-computing model. Thus, the components of the system manager 108 may be implemented as part of a stand-alone application on a personal computing device or a mobile device. Alternatively, or additionally, the components of the system manager 108 may be implemented in any application that allows creation and delivery of electronic messages to recipients.

As mentioned, the system manager 108 can include the model builder 702. In one or more embodiments, the model builder 702 trains a machine learning model to determine an acceptance probability for an identified first driver given a set of features associated with a current ride request that impact acceptance probability. In particular, the model builder 702 may train a gradient boosted decision tree classifier to determine the acceptance probability. In one or more alternative embodiments, the model builder 702 trains a machine learning model to determine an expected time-to-arrival associated with an identified first driver given a set of features associated with a current ride request that impact the expected time-to-arrival. For example, the model builder 702 may train a gradient boosted regression tree model to determine the expected time-to-arrival. Through training the models, the model builder 702 determines the degree of impact of each feature (i.e., the weight to be assigned to each feature when applying the model to a current ride request) on the model's respective output.

Additionally, the system manager 108 may include a probability of acceptance modeler 704. In one or more embodiments, the system manager 108 determines the expected time-to-arrival based on the acceptance probability of the identified first driver. In such embodiments, the system manager 108 determines the probability that the first driver will accept the ride request. In one or more embodiments, the probability of acceptance modeler 704 determines the probability of acceptance using a trained machine learning model, such as the machine learning model trained by the model builder 702. Alternatively, the probability of acceptance modeler 704 determines the acceptance probability using one or more heuristic approaches, such as those discussed with reference to FIGS. 5B and 5C.

Further, the system manager 108 may include an expected time-to-arrival modeler 706 to determine the expected time-to-arrival associated with the identified first driver. In one or more embodiments, the expected time-to-arrival modeler 706 determines the expected time-to-arrival based on the acceptance probability determined by the probability of acceptance modeler 704. In one or more alternative embodiments, the expected time-to-arrival modeler 706 determines the expected time-to-arrival using a trained machine learning model, such as the machine learning model trained by the model builder 702.

Additionally, the system manager 108 may include data storage 708. In particular, the data storage may include user data 710, model data 712, and state-of-the-world data 714. User data 710 stores user-specific features, such as those features that will be applied to a trained machine learning model to determine an acceptance probability or a model trained to determine an expected time-to-arrival. Additionally, model data 712 stores the models used in determining the expected time-to-arrival. In particular, model data 712 may store the models built by the model builder 702. Further, model data 712 stores the weights of each feature as determined by the model builder 702 to be used by the expected time-to-arrival modeler 706 in applying features to a trained machine learning model to determine the outcome of the learning model being used. Additionally, state-of-the-world data 714 stores all relevant information for the models that does not relate to any particular user. For example, state-of-the-world data 714 may store data regarding whether there is an event going on nearby, whether the system manager 108 is currently operating in primetime, current or expected future weather conditions, etc.

Figure 8:
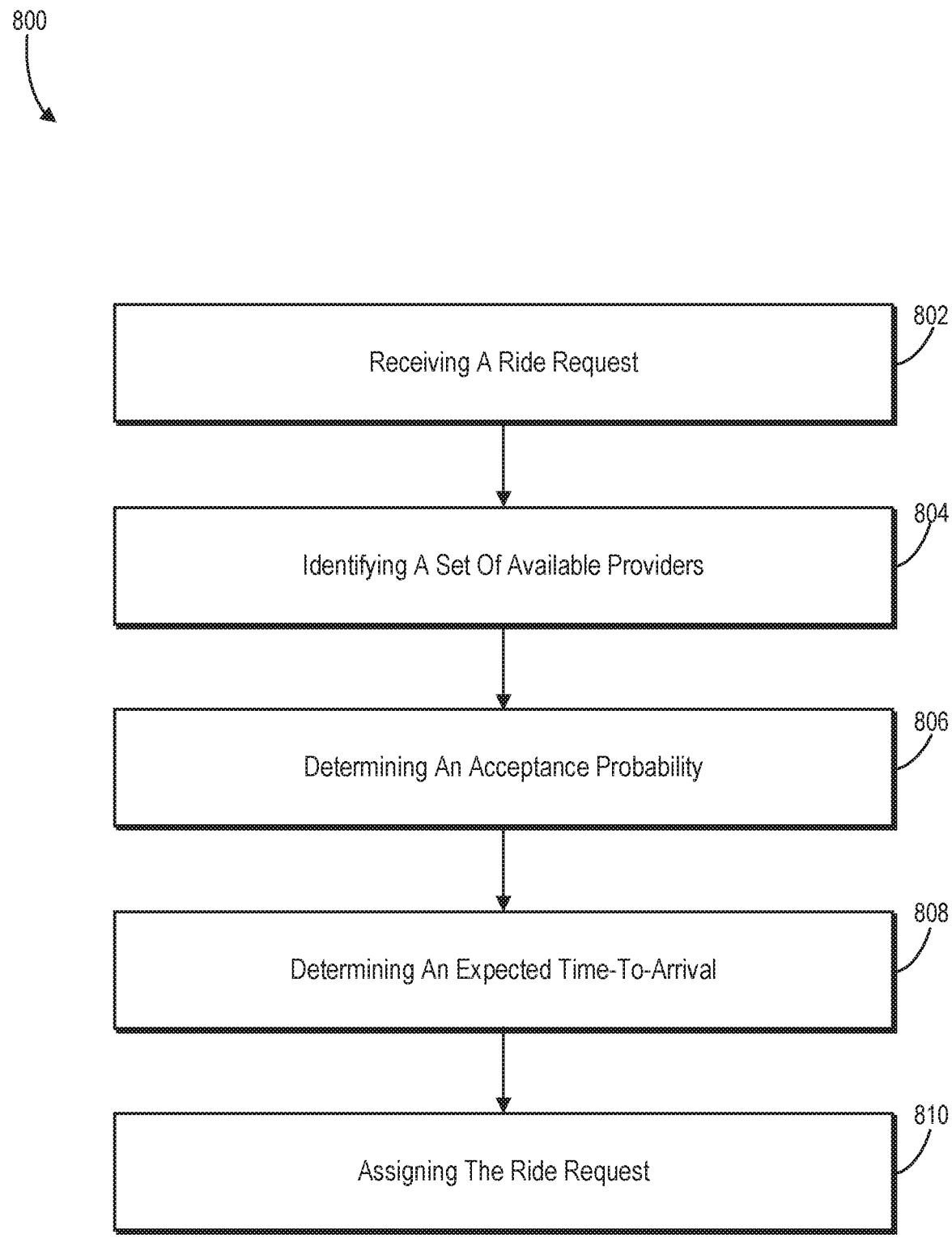
FIG. 8 illustrates a flowchart of a series of acts of assigning a ride request based on a determined expected time-to-arrival in accordance with one or more embodiments.

Turning now to FIG. 8, this figure illustrates a series of acts 800 to assign a ride request to a first driver from a set of available drivers based on an expected time-to-arrival. While FIG. 8 illustrates acts according to one embodiment, alternative embodiments may omit, add to, reorder, and/or modify any of the acts shown in FIG. 8. The acts of FIG. 8 can be performed as part of a method. In one or more embodiments, a non-transitory computer readable storage medium can comprise instructions that, when executed by one or more processors, cause a computing device to perform the acts of FIG. 8. In still further embodiments, a system can perform the acts of FIG. 8. In one or more embodiments, the system manager 108 generally considers several available drivers when matching a ride request and operates to determine which of those drivers should be matched to the request. In other words, the system manager 108 performs the series of acts 800 with regards to all nearby feasible drivers to determine which of the nearby feasible drivers is the best match for the ride request as was discussed above with reference to FIG. 3. Further, as also discussed with regards to FIG. 3, the one or more embodiments of the system manager 108 operates to match multiple drivers to multiple ride requests. In such scenarios, the system manager 108 operates to optimize the rider/driver pairings to satisfy an optimization metric.

The series of acts 800 includes an act 802 of receiving a ride request. For example, act 802 involves receiving a ride request from a client device associated with a rider. In particular, a ride request may include information relevant to the ride, such as a pick-up location, a destination location, a pick-up time, a rider profile, a rider history, or a rider rating, etc.

The series of acts 800 also includes an act 804 of identifying a set of available providers. For example, act 804 involves identifying a set of available providers (e.g., drivers) based on one or more characteristics of the ride request. The one or more characteristics of the ride request may include all, one of, or a subset of the information relevant to the ride discussed above. For example, the system manager 108 may identify a set of available providers based on the pick-up location associated with the ride request. In such a scenario, the expected time-to-arrival manger 108 identifies the pick-up location of the ride request and identifies the set of available providers to comprise all available providers within a predefined proximity to the pick-up location. Alternatively, the system manager 108 may identify the set of available providers to comprise a predefined number of available providers nearest to the pick-up location.

The series of acts 800 also includes an act 806 of determining an acceptance probability. For example, the act 806 involves determining a probability of accepting the ride request for each provider of the set of available providers. In one or more embodiments, determining the probability of accepting the ride request for each provider comprises applying a set of features to a machine learning model trained to determine an acceptance probability. For example, the system manager may apply a set of features to a gradient boosted decision tree classifier to determine the probability of acceptance. In one or more embodiments, the system manager 108 determines the expected time-to-arrival directly without explicitly determining the acceptance probability. Examples of features that may be used include the exponentially weighted mean accept rate of the provider, the estimated time-to-arrival of the provider, the estimated time-to-arrival of the next nearest provider (i.e., next nearest to the pick-up location), the number of recent accepts by the provider (e.g., over the last one-hour period), the number of recent lapses or rejections by the provider (e.g., over the last one-hour period), the latitude and longitude of the pick-up location associated with the ride request, the hour of the day the ride request is submitted, the day of the week the ride request is submitted, the primetime experienced by the ride request, the rating of the rider associated with the request, or whether or not the provider is in destination mode.

In one or more alternative embodiments, the system manager 108 determines the probability of acceptance using heuristic methods. In particular, the system manager 108 determines a probability metric. For example, the system manager may determine an average accept rate of each provider over a previous time period (e.g., the last twenty-four hours). Alternatively, the system manager 108 determines an exponentially weighted average accept rate of each provider. Subsequently, the system manager 108 determines the probability that each provider will accept the ride request based on the probability metric. For example, in one or more embodiments, the system manager 108 makes a direct correlation between the probability metric and the provider's probability of acceptance.

The series of acts 800 also includes an act 808 of determining an expected time-to-arrival. For example, the act 808 involves determining an expected time-to-arrival for each provider of the set of available providers based on the probability of accepting the ride request for each provider. In one or more embodiments, the system manager 108 also determines a first estimated time-to-arrival associated with each provider and an alternate estimated time-to-arrival associated with a provider who will be re-assigned the ride request upon rejection of the request by the assigned provider. The re-assigned provider may or may not be known at the time of determining the alternate estimated time-to-arrival; therefore, there are multiple approaches to determining this value. In one or more embodiments, the alternate estimated time-to-arrival comprises a second estimated time-to-arrival associated with a second provider identified based on one or more characteristics of the ride request. In other words, the system manager 108 identifies the re-assigned provider and determines the time that would be required by the identified re-assigned provider to travel to the pick-up location upon re-assignment of the ride request. In one or more alternative embodiments, the expected time-to-arrival manger 108 determines the alternate estimated time-to-arrival using a combination of the first estimated time-to-arrival associated with each provider from the set of providers and one or more additional estimated time-to-arrival values associated with one or more additional providers within a predefined proximity to the rider. The system manager 108 may determine the expected time-to-arrival further based on the first estimated time-to-arrival and the alternate estimated time-to-arrival.

The series of acts 800 also includes the act 810 of assigning the ride request. For example, the act 810 involves assigning the ride request to a first provider from the set of available providers based on optimizing the expected time-to-arrival across the set of available providers. In one or more embodiments, the system manager may not assign a ride request to a provider associated with an undesirable expected time-to-arrival, even if that provider is the closest provider to the pick-up location. In particular, upon receiving a ride request, the system manager 108 may identify one or more providers available to fulfill the ride request. The system manager 108 may then determine the expected time-to-arrival associated with each of the one or more available providers. Subsequently, the system manager 108 may assign the ride request to the provider associated with the lowest expected time-to-arrival.

Figure 9:
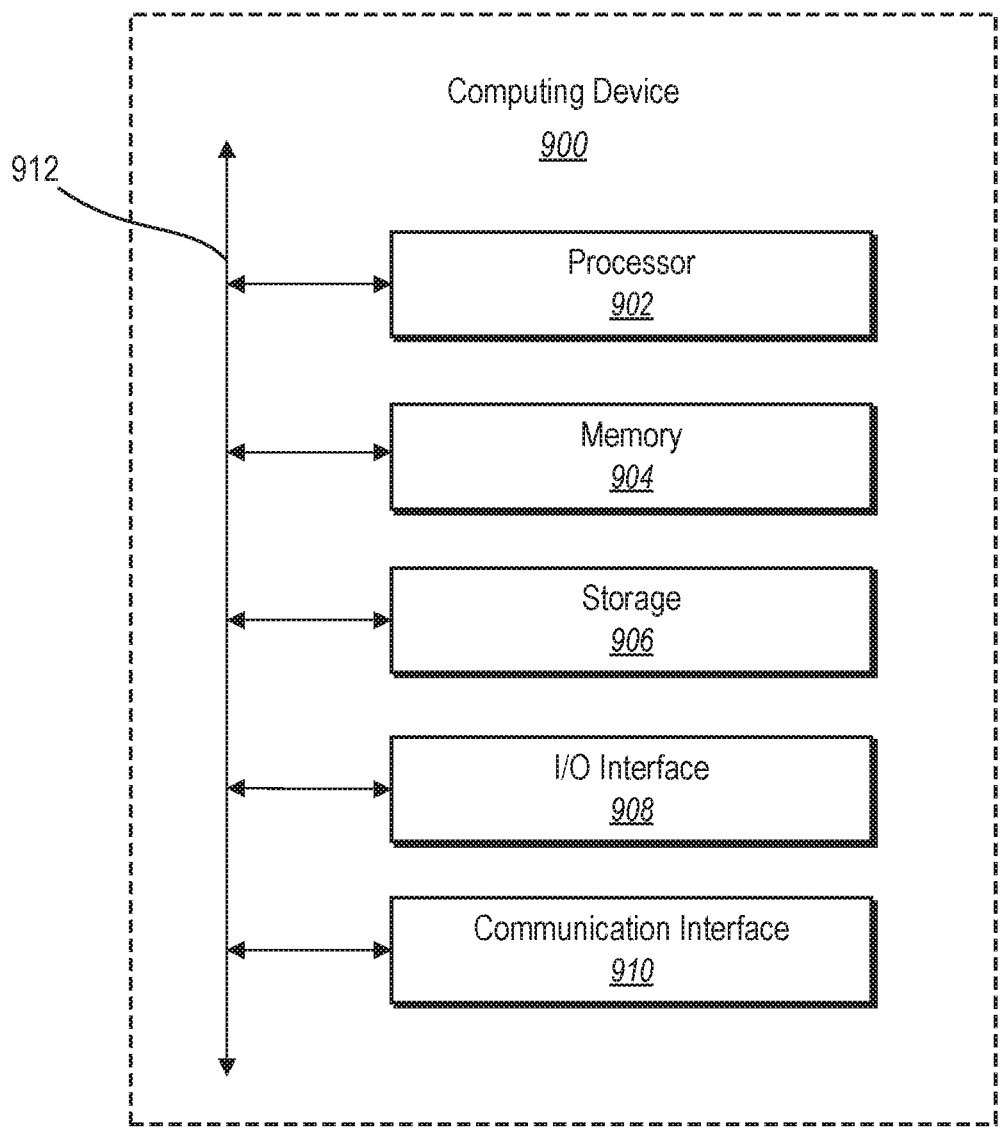
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices, such as the computing device 900 may represent the computing devices described above (e.g., server(s) 104, driver device 110, rider devices 116*a*-116*n*). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown by FIG. 9, the computing device can include one or more processor(s) 902, memory 904, a storage device 906, input/output ("I/O") interfaces 908, and a communication interface 910, which may be communicatively coupled by way of a communication infrastructure (e.g., bus 912). In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

Figure 10:
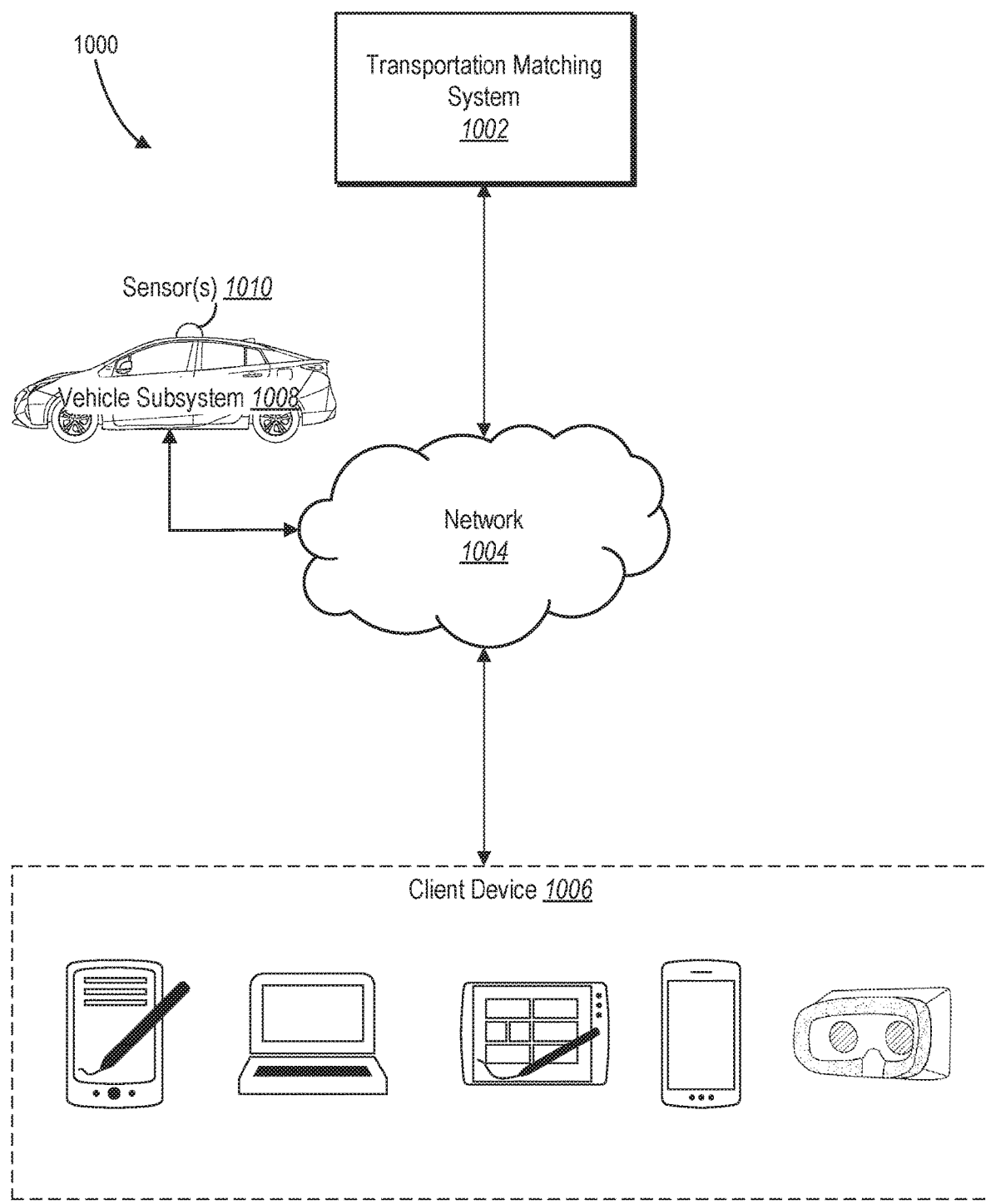
FIG. 10 illustrates an example environment for a transportation system in accordance with one or more embodiments.

FIG. 10 illustrates an example network environment 1000 of a transportation service system. The network environment 1000 includes a client system 1006, a transportation service system 1002, and a vehicle subsystem 1008 connected to each other by a network 1004. Although FIG. 10 illustrates a particular arrangement of the client system 1006, transportation service system 1002, vehicle subsystem 1008, and network 1004, this disclosure contemplates any suitable arrangement of client system 1006, transportation service system 1002, vehicle subsystem 1008, and network 1004. As an example, and not by way of limitation, two or more of client system 1006, transportation service system 1002, and vehicle subsystem 1008 communicate directly, bypassing network 1004. As another example, two or more of client system 1006, transportation service system 1002, and vehicle subsystem 1008 may be physically or logically co-located with each other in whole or in part. Moreover, although FIG. 10 illustrates a particular number of client systems 1006, transportation service systems 1002, vehicle subsystems 1008, and networks 1004, this disclosure contemplates any suitable number of client systems 1006, transportation service systems 1002, vehicle subsystems 1008, and networks 1004. As an example, and not by way of limitation, network environment 1000 may include multiple client system 1006, transportation service systems 1002, vehicle subsystems 1008, and networks 1004.

This disclosure contemplates any suitable network 1004. As an example, and not by way of limitation, one or more portions of network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 may include one or more networks 1004.

Links may connect client system 1006, transportation service system 1002, and vehicle subsystem 1008 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client system 1006 may be an electronic device including hardware, software, or embedded logic components or a combination of two or more such components and capable of carrying out the appropriate functionalities implemented or supported by client system 1006. As an example, and not by way of limitation, a client system 1006 may include any of the computing devices discussed above in relation to FIG. 9. A client system 1006 may enable a network user at client system 1006 to access network 1004. A client system 1006 may enable its user to communicate with other users at other client systems 1006.

In particular embodiments, client system 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1006 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 1006 one or more Hyper Text Markup Language (HTML) files responsive to the HTTP request. Client system 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation service system 1002 may be a network-addressable computing system that can host a ride share transportation network. Transportation service system 1002 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation service system 1002. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation service system 1002 may manage ride matching services to connect a user/requester with a vehicle and/or provider. By managing the ride matching services, the transportation service system 1002 can manage the distribution and allocation of vehicle subsystem 1008 resources and user resources such as GPS location and availability indicators, as described herein.

Transportation service system 1002 may be accessed by the other components of network environment 1000 either directly or via network 1004. In particular embodiments, transportation service system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation service system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1006, or a transportation service system 1002 to manage, retrieve, modify, add, or delete, the information stored in data store.

In particular embodiments, transportation service system 1002 may provide users with the ability to take actions on various types of items or objects, supported by transportation service system 1002. As an example, and not by way of limitation, the items and objects may include ride share networks to which users of transportation service system 1002 may belong, vehicles why users may request, location designators, computer-based applications that a user may use, transactions that allow users to buy or sell items via the service, interactions with advertisements that a user may perform, or other suitable items or objects. A user may interact with anything that is capable of being represented in transportation service system 1002 or by an external system of a third-party system, which is separate from transportation service system 1002 and coupled to transportation service system 1002 via a network 1004.

In particular embodiments, transportation service system 1002 may be capable of linking a variety of entities. As an example, and not by way of limitation, transportation service system 1002 may enable users to interact with each other or other entities, or to allow users to interact with these entities through an application programming interfaces (API) or other communication channels.

In particular embodiments, transportation service system 1002 may include a variety of servers, sub-systems, programs, modules, logs, and data stores. In particular embodiments, transportation service system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation service system 1002 may also include suitable components such as network interfaces, security mechanisms, load balancers, failover servers, management-and-network-operations consoles, other suitable components, or any suitable combination thereof. In particular embodiments, transportation service system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation service system 1002 and one or more client systems 1006. An action logger may be used to receive communications from a web server about a user's actions on or off transportation service system 1002. In conjunction with the action log, a third-party-content-object log may be maintained of user exposures to third-party-content objects. A notification controller may provide information regarding content objects to a client system 1006. Information may be pushed to a client system 1006 as notifications, or information may be pulled from client system 1006 responsive to a request received from client system 1006. Authorization servers may be used to enforce one or more privacy settings of the users of transportation service system 1002. A privacy setting of a user determines how particular information associated with a user can be shared. The authorization server may allow users to opt in to or opt out of having their actions logged by transportation service system 1002 or shared with other systems, such as, for example, by setting appropriate privacy settings. Third-party-content-object stores may be used to store content objects received from third parties. Location stores may be used for storing location information received from client systems 1006 associated with users.

In addition, the vehicle subsystem 1008 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) 1010 can be mounted on the top of the vehicle subsystem 1008 or else can be located within the interior of the vehicle subsystem 1008. In certain embodiments, the sensor(s) 1010 can be located in multiple areas at once—i.e., split up throughout the vehicle subsystem 1008 so that different components of the sensor(s) 1010 can be placed in different locations in accordance with optimal operation of the sensor(s) 1010. In these embodiments, the sensor(s) 1010 can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1008 may include a communication device capable of communicating with the client system 1006 and/or the transportation service system 1002. For example, the vehicle subsystem 1008 can include an on-board computing device communicatively linked to the network 1004 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method, comprising:
   receiving a ride request from a client device associated with a requestor;
   identifying a set of available providers based on one or more characteristics of the ride request;
   generating, for each provider of the set of available providers, an expected time-to-arrival that corresponds to a time for a provider to travel to a pick-up location associated with the ride request and factors in time delays associated with an assignment of the ride request and a subsequent rejection of the ride request by:
   determining a probability of accepting the ride request for each provider;
   determining an alternate estimated time-to-arrival for each provider, wherein the alternate estimated time-to-arrival associated with a first provider corresponds to a time for a second provider to travel to the pick-up location associated with the ride request if the first provider is assigned the ride request and rejects the ride request; and
   determining the expected time-to-arrival for each provider based on the probability of accepting the ride request for each provider and the alternate estimated time-to-arrival for each provider; and assigning the ride request to the first provider from the set of available providers based on optimizing the expected time-to-arrival across the set of available providers.

2. The method of claim 1, wherein determining the probability of accepting the ride request for each provider of the set of available providers comprises using heuristic methods comprising:
   determining a probability metric; and
   determining the probability of accepting the ride request for each provider of the set of available providers based on the probability metric.

3. The method of claim 2, wherein determining the probability metric comprises determining an average accept rate over a previous time period for each provider of the set of available providers.

4. The method of claim 2, wherein determining the probability metric comprises determining an exponentially weighted average accept rate for each provider of the set of available providers.

5. The method of claim 4, wherein determining the exponentially weighted average accept rate for each provider of the set of available providers comprises assigning a weight value to each of a plurality of contributing acceptances, wherein the assigned weight value correlates to a recency of each of the plurality of contributing acceptances.

6. The method of claim 1, further comprising:
   determining a first estimated time-to-arrival associated with each provider of the set of available providers, the first estimated time-to-arrival associated with the first provider corresponding to a time for the first provider to travel to the pick-up location associated with the ride request if the first provider is assigned the ride request and accepts the ride request,
   wherein determining the expected time-to-arrival for each provider of the set of available providers is further based on the first estimated time-to-arrival associated with each provider of the set of available providers.

7. The method of claim 6, wherein the alternate estimated time-to-arrival associated with the first provider comprises a combination of:
   the first estimated time-to-arrival associated with the first provider; and
   one or more additional estimated time-to-arrival values associated with one or more additional providers within the set of available providers.

8. The method of claim 1, further comprising identifying the second provider based on the one or more characteristics of the ride request, wherein the alternate estimated time-to-arrival comprises an estimated time-to-arrival associated with the second provider.

9. The method of claim 8, wherein:
   the first provider comprises a closest provider to the pick-up location associated with the ride request; and
   the second provider comprises a next closest provider to the pick-up location associated with the ride request.

10. The method of claim 1, wherein determining the probability of accepting the ride request for each provider of the set of available providers comprises applying a set of features to a machine learning model trained to determine an acceptance probability.

11. The method of claim 10, wherein the set of features comprises one or more of an exponentially weighted mean accept rate, a first estimated time-to-arrival, the alternate estimated time-to-arrival, a number of recent provider lapses, coordinates of the pick-up location associated with the ride request, a time-of-day of the ride request, a day-of-week of the ride request, a primetime experienced by the ride request, a rider rating, or a destination mode setting of the provider.

12. The method of claim 1, wherein the time delays associated with the assignment of the ride request and the subsequent rejection of the ride request comprises at least one of:
   a delay associated with an initial assignment of the ride request;
   a delay associated with waiting for a rejection of the ride request; or
   a delay associated with a re-assignment of the ride request.

13. A non-transitory computer readable storage medium comprising instructions that, when executed by at least one processor, cause a computer device to:
   receive a ride request from a client device associated with a requestor;
   identify a set of available providers based on one or more characteristics of the ride request;
   generate, for each provider of the set of available providers, an expected time-to-arrival that corresponds to a time for a provider to travel to a pick-up location associated with the ride request and factors in time delays associated with an assignment of the ride request and a subsequent rejection of the ride request by:
      determining a probability of accepting the ride request for each provider;
      determining an alternate estimated time-to-arrival for each provider, wherein the alternate estimated time-to-arrival associated with a first provider corresponds to a time for a second provider to travel to the pick-up location associated with the ride request if the first provider is assigned the ride request and rejects the ride request; and
      determining the expected time-to-arrival for each provider based on the probability of accepting the ride request for each provider and the alternate estimated time-to-arrival for each provider; and
   assign the ride request to the first provider from the set of available providers based on optimizing the expected time-to-arrival across the set of available providers.

14. The non-transitory computer readable storage medium of claim 13, wherein determining the probability of accepting the ride request for each provider of the set of available providers comprises applying a set of features to a machine learning model trained to determine an acceptance probability.

15. The non-transitory computer readable storage medium of claim 14, wherein the machine learning model comprises a gradient boosted decision tree classifier.

16. The non-transitory computer readable storage medium of claim 13, further comprising instructions that, when executed by the at least one processor, cause the computing device to:
   determine an estimated time-to-arrival associated with each provider of the set of available providers, the estimated time-to-arrival associated with the first provider corresponding to a time for the first provider to travel to the pick-up location associated with the ride request if the first provider is assigned the ride request and accepts the ride request,
   wherein determining the expected time-to-arrival for each provider of the set of available providers is further based on the estimated time-to-arrival associated with each provider of the set of available providers.

17. The non-transitory computer readable storage medium of claim 16, wherein the alternate estimated time-to-arrival equals the expected time-to-arrival.

18. A system comprising:
at least one processor; and
a non-transitory computer readable storage medium comprising instructions that, when executed by the at least one processor, cause the system to:
receive a ride request from a client device associated with a requestor;
identify a set of available providers based on one or more characteristics of the ride request;
generate, for each provider of the set of available providers, an expected time-to-arrival that corresponds to a time for a provider to travel to a pick-up location associated with the ride request and factors in time delays associated with an assignment of the ride request and a subsequent rejection of the ride request by:
determining a probability of accepting the ride request for each provider;
determining an alternate estimated time-to-arrival for each provider, wherein the alternate estimated time-to-arrival associated with a first provider corresponds to a time for a second provider to travel to the pick-up location associated with the ride request if the first provider is assigned the ride request and rejects the ride request; and
determining the expected time-to-arrival for each provider based on the probability of accepting the ride request for each provider and the alternate estimated time-to-arrival for each provider; and
assign the ride request to the first provider from the set of available providers based on optimizing the expected time-to-arrival across the set of available providers.

19. The system of claim 18, further comprising instructions that, when executed by the at least one processor, cause the system to identify the second provider based on the one or more characteristics of the ride request, wherein the alternate estimated time-to-arrival comprises an estimated time-to-arrival associated with the second provider.

20. The system of claim 19, wherein:
the first provider comprises a closest provider to the pick-up location associated with the ride request; and
the second provider comprises a next closest provider to the pick-up location associated with the ride request.

* * * * *